United States Patent
Felix, Jr. et al.

(10) Patent No.: US 6,592,756 B1
(45) Date of Patent: Jul. 15, 2003

(54) SWIMMING POOL SKIMMER BASKET HANDLE AND REVERSIBLE WEIGHT

(75) Inventors: John Paul Felix, Jr., Georgetown, TX (US); James Keet Lewis, III, Dallas, TX (US); David Wayne Chilcoat, Oklahoma City, OK (US)

(73) Assignee: Cool Pool Solutions, Inc., Dallas, TX (US)

( * ) Notice: Subject to any disclaimer, the term of this patent is extended or adjusted under 35 U.S.C. 154(b) by 0 days.

(21) Appl. No.: 09/535,351

(22) Filed: Mar. 24, 2000

(51) Int. Cl.[7] .............................. E04H 4/16; B01D 35/02
(52) U.S. Cl. ...................... 210/169; 210/232; 210/238; 210/470; 210/477
(58) Field of Search ................................. 210/169, 232, 210/237, 238, 470, 471, 477, 483; 4/290, 291, 292, 496

(56) References Cited

U.S. PATENT DOCUMENTS

| | | | | |
|---|---|---|---|---|
| 387,236 A | * | 8/1888 | Knowlton | |
| 1,127,301 A | * | 2/1915 | Smith | |
| 2,680,251 A | * | 6/1954 | Cotterman | |
| 3,080,060 A | * | 3/1963 | Blumenkranz et al. | |
| 3,380,592 A | * | 4/1968 | Arnold | |
| 3,469,700 A | * | 9/1969 | Johnson | |
| 4,176,419 A | * | 12/1979 | MacDonald | |
| 4,459,209 A | * | 7/1984 | Broadwater | |
| 4,460,462 A | * | 7/1984 | Arneson | |
| 4,718,188 A | * | 1/1988 | Roberts | |
| 5,072,538 A | * | 12/1991 | Hendricks et al. | |
| 5,830,350 A | | 11/1998 | Voss et al. | ............... 210/169 |
| 6,180,017 B1 | * | 1/2001 | Usher | |

* cited by examiner

Primary Examiner—David A. Simmons
Assistant Examiner—Fred Prince

(57) ABSTRACT

There is disclosed a swimming pool skimmer basket handle capable of being attached to a swimming pool skimmer basket, in which the handle has a column that positions a grip of the handle above the top of the skimmer basket when the handle is attached to the skimmer basket. The column of the handle also positions the grip of the handle above the top of the water level in a skimmer well when the handle is attached to the skimmer basket and the skimmer basket is located within the skimmer well. The improved accessibility of the grip of the handle significantly minimizes the unpleasantness associated with removing and cleaning a swimming pool skimmer basket. There is also disclosed an improved reversible weight for a skimmer basket. The reversible weight is capable of being attached to a skimmer basket in two configurations. A number of alternate embodiments of the invention are also disclosed.

44 Claims, 25 Drawing Sheets

Fig. 19
Fig. 20
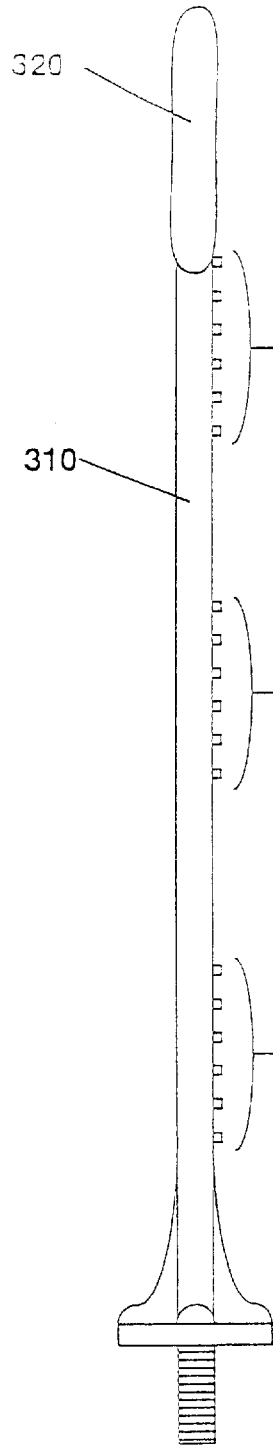
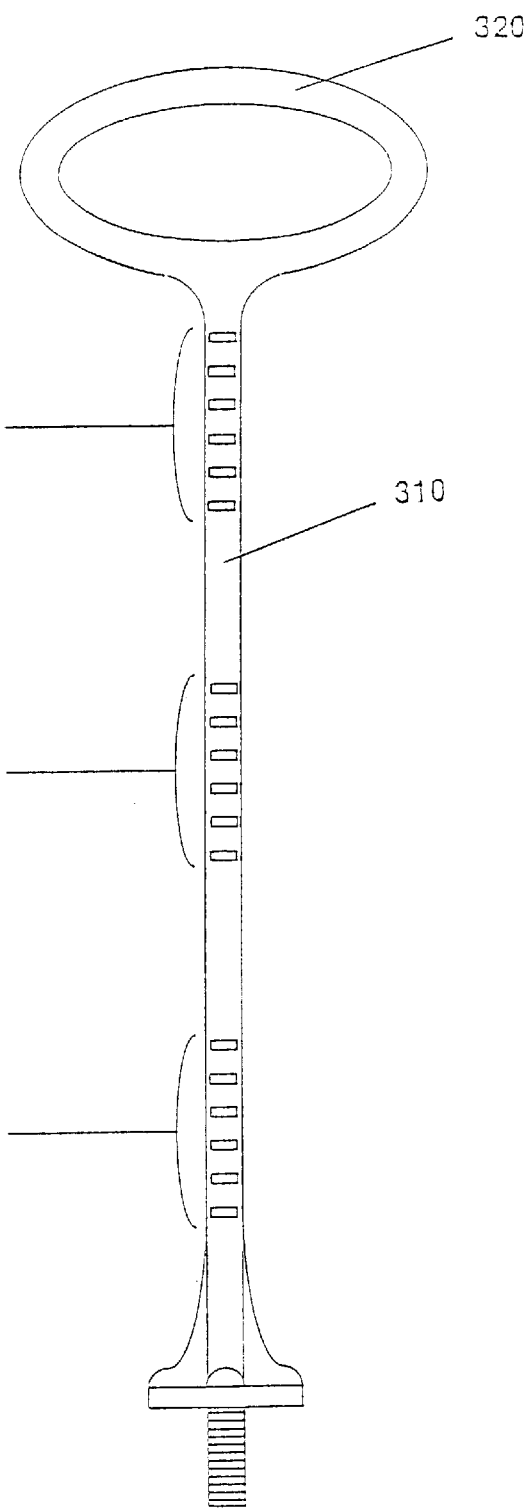

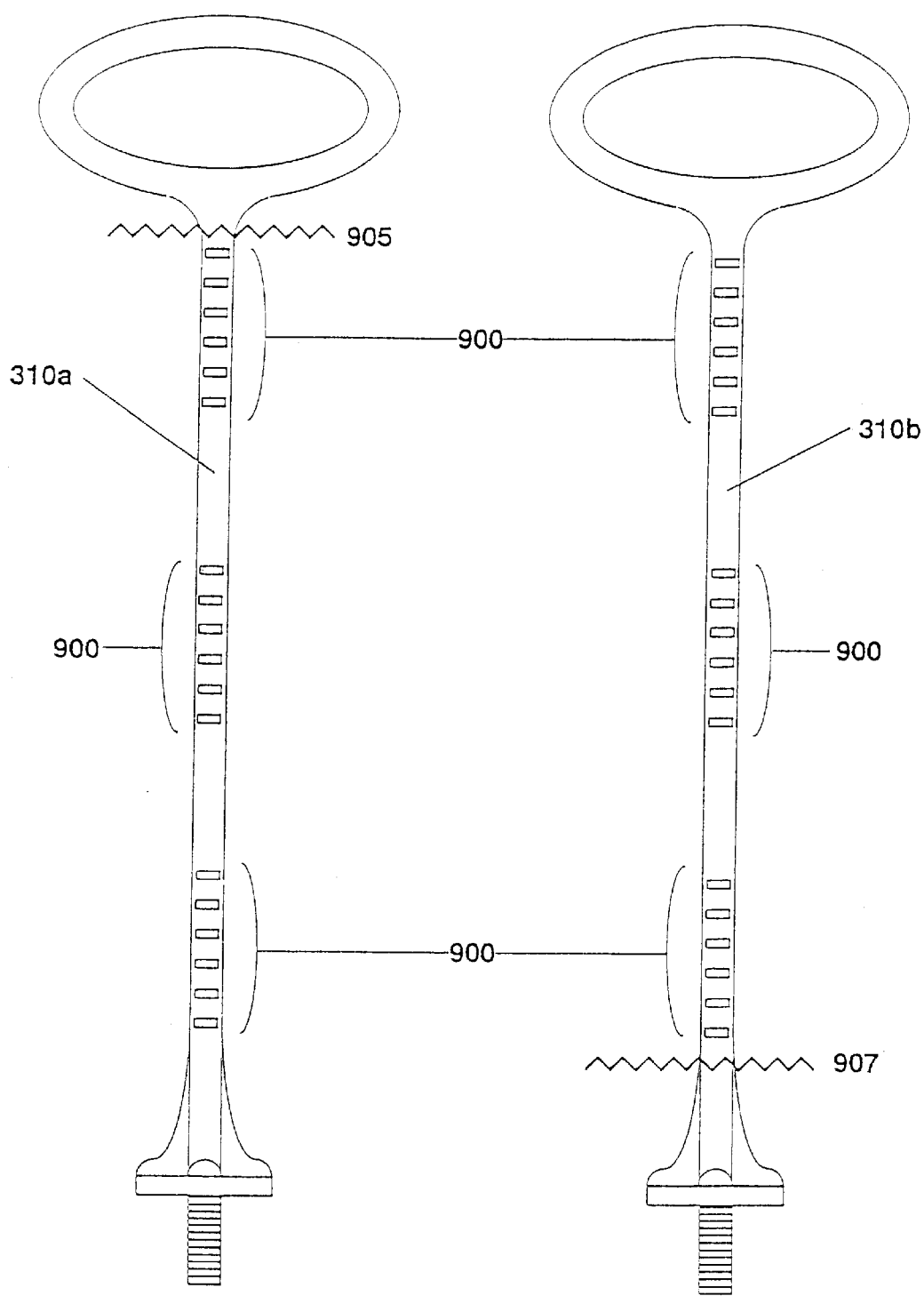

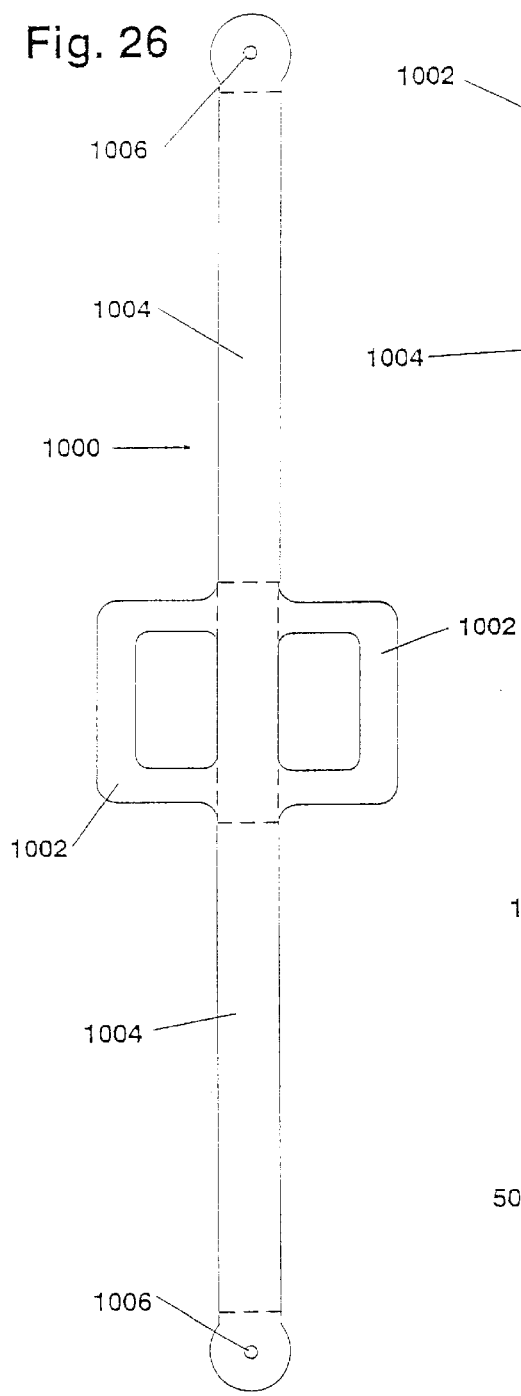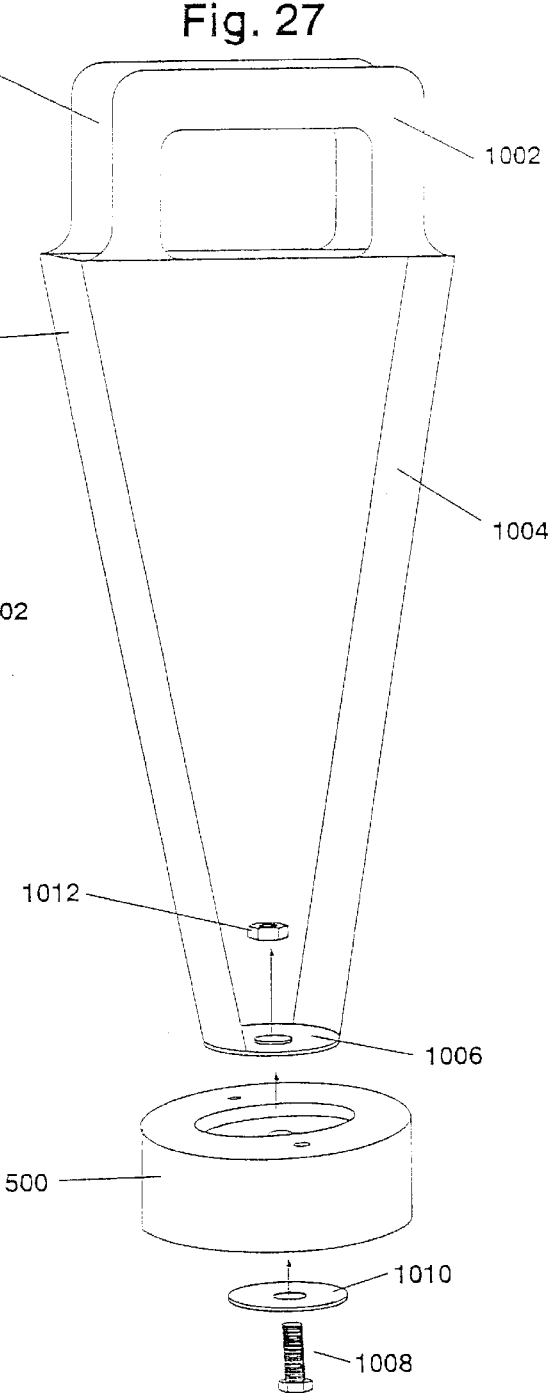

SWIMMING POOL SKIMMER BASKET HANDLE AND REVERSIBLE WEIGHT

TECHNICAL FIELD OF THE INVENTION

The present invention is directed, in general, to the cleaning of swimming pools, and, more specifically, to an improved skimmer well basket handle capable of being attached to a skimmer well basket. The present invention is also directed to an improved reversible weight capable of being attached to a skimmer well basket in two configurations.

BACKGROUND OF THE INVENTION

Modern swimming pools are usually equipped with a pool skimmer system. One feature, of such a system is a skimmer well that collects floating debris from the surface of the pool. Such debris can include leaves, trash, roaches, crickets and other insects, frogs, snakes, mice, and other similar items. When such floating debris enters a skimmer well, the floating debris is collected in a skimmer basket that sits inside the skimmer well. The skimmer basket acts as an initial filter or strainer which traps the floating debris while allowing the pool water to flow through the skimmer basket and then into the pool pump and through the master filtration unit and back into the pool.

Because a skimmer basket fills up with debris over time, the skimmer basket must be emptied and cleaned periodically. In order to empty and clean a skimmer basket, the cleaning person must reach down into the skimmer well and pull the skimmer basket out of the skimmer well. Due to the tight clearance of the skimmer basket within the skimmer well, it is necessary to lift the skimmer basket straight up to get it out of the skimmer well.

This can sometimes require the cleaning person to use both hands to reach down into the inside of the skimmer basket to get a firm hold on the skimmer basket in order to lift the skimmer basket straight up and out of the skimmer well. This means that the cleaning person will be required to put his or her hand into the unpleasant debris that has collected in the skimmer basket. There may also be unpleasant debris floating above the basket because the normal water level is above the top of the skimmer basket.

An apparatus is desired that would allow a cleaning person to avoid reaching down through the debris into the inside of a skimmer basket when the skimmer basket is being removed from its swimming pool skimmer well for emptying and cleaning. An apparatus is also desired that would allow a cleaning person to reach down into the skimmer well and remove the skimmer basket without putting his or her hands under the water.

Some prior art skimmer basket handles comprise small thin plastic straps or a small ridged side clip attached to the sides of the skimmer basket. The small thin plastic straps are generally not very strong and some are easily breakable. The small thin plastic straps and the small side clips rest inside of the skimmer basket below the water line and in the midst of the undesirable debris that has accumulated in the skimmer basket. In order to pick up such handles it is necessary to reach down into the inside of the skimmer basket and touch the undesirable debris in the skimmer basket.

Some other prior art skimmer basket handles comprise small metal or plastic wires that are connected to the rim of the skimmer basket. In the course of time such handles will become broken or detached or lost. This means that the cleaning person will be required to put his or her hand into the unpleasant debris that has accumulated in the skimmer basket.

In addition, many prior art skimmer baskets do not have a weight incorporated into the basket design. Skimmer baskets are usually made of lightweight material such as plastic. A skimmer basket that lacks a weight will float up through the debris in the skimmer well when the pool pump is not operating and not circulating water through the skimmer well. When the skimmer basket floats upwardly with respect to its seated position within the skimmer well, it will break the seal between the walls of the skimmer well and the rim of the skimmer basket. Then when the pool pump is turned on, there is a possibility that debris will lodge in the space between the rim of the skimmer basket and the walls of the skimmer well, thereby preventing the skimmer basket from properly seating itself in the skimmer well basket seat location. This would cause the skimmer well basket to be out of position and not able to properly filter the debris in the skimmer well. If the debris reaches and enters the pool pump, it could harm the pool pump.

Some prior art skimmer baskets do have a weight incorporated into the basket design. However, in many cases the weight is not sufficiently heavy to keep the skimmer basket properly seated and sealed within its proper seat position within the skimmer well. The lack of a sufficiently heavy weight permits the skimmer basket to float up through the debris when the pool pump is not operating and not circulating water through the skimmer well.

SUMMARY OF THE INVENTION

The most undesirable and time consuming task in swimming pool maintenance is removing and cleaning the skimmer basket. The present invention significantly minimizes both the unpleasantness and the maintenance time associated with that task.

The invention comprises a handle capable of being attached to a skimmer basket where the handle has a column that positions a grip of the handle above the top of the skimmer basket and above the top of the water level when the handle is attached to the skimmer basket. The invention further comprises a reversible weight that may be connected to the skimmer basket in two different configurations. One of the configurations of the reversible weight permits the skimmer basket handle to be attached to the skimmer basket without drilling or punching an aperture in the bottom of the skimmer basket. One of the configurations of the reversible weight permits the skimmer basket handle to be attached to the skimmer basket in a manner that does not change the clearance distance of the bottom of the skimmer basket from the bottom of the skimmer well.

It is a primary object of the present invention to provide an improved skimmer basket handle capable of being attached to a skimmer well basket.

It is another object of the present invention to provide an improved skimmer basket handle capable of being attached to a skimmer well basket, wherein the improved skimmer basket handle has an extended column to permit a cleaning person to have easy access to the portion of the handle to be gripped when the skimmer basket is removed from a skimmer well.

It is another object of the present invention to provide an improved skimmer basket handle capable of being attached to a skimmer well basket, wherein the improved skimmer basket handle has an extended column to permit a cleaning person to avoid having to put his or her hands into the unpleasant debris that has accumulated in the skimmer basket when removing the skimmer basket from a skimmer well.

It is another object of the present invention to provide an improved skimmer basket handle capable of being attached to a skimmer well basket, wherein the improved skimmer basket handle has an extended column that positions the portion of the handle to be gripped beneath the top edge of a skimmer well, when the skimmer basket is within the skimmer well.

It is an additional object of the present invention to provide an improved skimmer basket handle capable of being attached to a skimmer well basket, wherein the improved skimmer basket handle is sturdy and not easily breakable.

It is another object of the present invention to provide an improved skimmer basket handle capable of being attached to a skimmer well basket, wherein the improved skimmer basket handle has an extended column with a handle grip to permit a cleaning person to easily shake out the debris collected in the skimmer basket by simply shaking or tapping the skimmer basket over or in a collection container or trash bag so that the cleaning person does not touch the debris or get wet.

It is another object of the present invention to provide an improved skimmer basket handle capable of being attached to a skimmer well basket, wherein the improved skimmer basket handle has an extended column with a handle grip to permit proper circulation of water through the skimmer basket.

It is an additional object of the present invention to provide an improved skimmer basket handle capable of being attached to a skimmer well basket, wherein the improved skimmer basket handle has an extended column with a handle grip to permit a cleaning person to quickly and easily rinse off the skimmer basket using a common garden hose without getting wet.

It is another object of the present invention to provide an improved skimmer basket handle capable of being attached to a skimmer well basket, wherein the improved skimmer basket handle is capable of being attached to a skimmer basket weight that allows the basket to remain in its proper seated position in the skimmer well even when the pool pump is not operating to circulate water.

It is another object of the present invention to provide an improved skimmer basket handle capable of being attached to a skimmer well basket, wherein the improved skimmer basket handle is capable of being attached to a reversible weight that may be attached to the skimmer basket in two configurations.

It is another object of the present invention to provide an improved skimmer basket handle capable of being attached to a skimmer well basket, wherein the improved skimmer basket handle can be attached to a variety of existing skimmer baskets that are already in use in swimming pools.

It is another object of the present invention to provide an improved skimmer basket handle capable of being attached to a skimmer well basket, wherein the improved skimmer basket can be used in residential swimming pools as well as in commercial swimming pools.

It is another object of the present invention to provide an improved skimmer basket, handle capable of being attached to a skimmer well basket, wherein the length of the improved skimmer basket handle can be extended by use of an extension handle to accommodate deeper skimmer wells in commercial swimming pools.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 19 shows a side view of an alternative embodiment of the skimmer basket handle of the present invention showing a skimmer basket handle column that has lateral extensions on a side of the handle column that may be interlocked with other similar lateral extensions on other handle columns; and FIG. 20 shows a front view of the alternative embodiment of the skimmer basket handle of the present invention having a handle column as shown in FIG. 19; and FIG. 21 shows a front view of the alternative embodiment of the skimmer basket handle of the present invention as shown in FIG. 20 showing a location where the handle column may be cut to form a base handle for securing an extension handle by interlocking the lateral extensions on the side of the base handle with the lateral extensions on the side of the extension handle; and FIG. 22 shows a front view of the alternative embodiment of the skimmer basket handle of the present invention as shown in FIG. 20 showing a location where the handle column may be cut to form an extension handle to be secured to a base handle by interlocking the lateral extensions on the side of the base handle with the lateral extensions of the side of the extension handle; FIG. 24a shows a perspective view of the locking clip shown in FIG. 24 in a closed position; and FIG. 24b shows a plan view of the locking clip shown in FIG. 24 shown in an open position; FIG. 26 shows a plan view of an alternate embodiment of the skimmer basket handle of the present invention comprising a strip of flexible material; and FIG. 27 shows a perspective view of the alternate embodiment of the skimmer basket handle of the present invention shown in FIG. 26 showing how the strip of flexible material is folded for connection to a skimmer basket.

DETAILED DESCRIPTION OF THE INVENTION

FIGS. 1 through 31, discussed below, and the various embodiments used to describe the principles of the present invention in this patent document are by way of illustration only and should not be construed in any way to limit the scope of the invention. Those skilled in the art will understand that the principles of the present invention may be implemented in a suitably modified skimmer basket handle and a suitably modified skimmer basket reversible weight.

Figure 1:
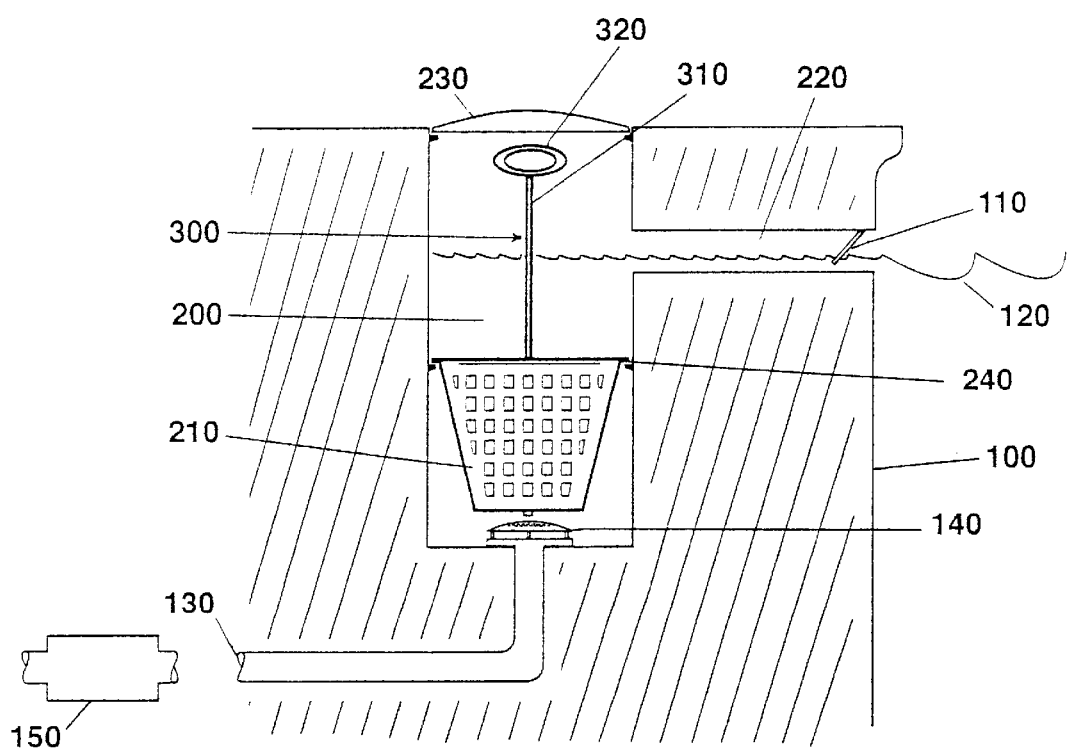
FIG. 1 shows a cross sectional view of a swimming pool skimmer well containing a skimmer basket with a skimmer basket handle of the present invention attached to the skimmer basket.

FIG. 1 depicts a cross sectional view of a portion of a wall of swimming pool 100 having skimmer well 200 containing skimmer basket 210. The sides and bottom of skimmer basket 210 are formed having perforations to permit water to flow through the sides and bottom of skimmer basket 210. Floating debris (not shown) has access to skimmer basket 210 via channel 220 that connects the surface of the water in swimming pool 100 with skimmer well 200. When pool pump 150 is operating, floating debris enters skimmer well 200 and either remains floating in skimmer well 200 or sinks down into skimmer basket 210. The water that has carried the floating debris past one-way skimmer well door 110 flows into skimmer well 200 and through the sides and bottom of skimmer basket 210. The water then passes through flow valve 140 and returns to swimming pool 100 via channel 130 that leads to pool pump 150 and then to a master filtration unit (not shown). The filtered water is then returned to swimming pool 100.

Skimmer well 200 usually has a cylindrical shape and is covered by skimmer well cover 230. Skimmer well cover 230 is removed from skimmer well 200 so that a cleaning person can remove skimmer basket 210 from skimmer well 200 for emptying and cleaning.

Figure 2:
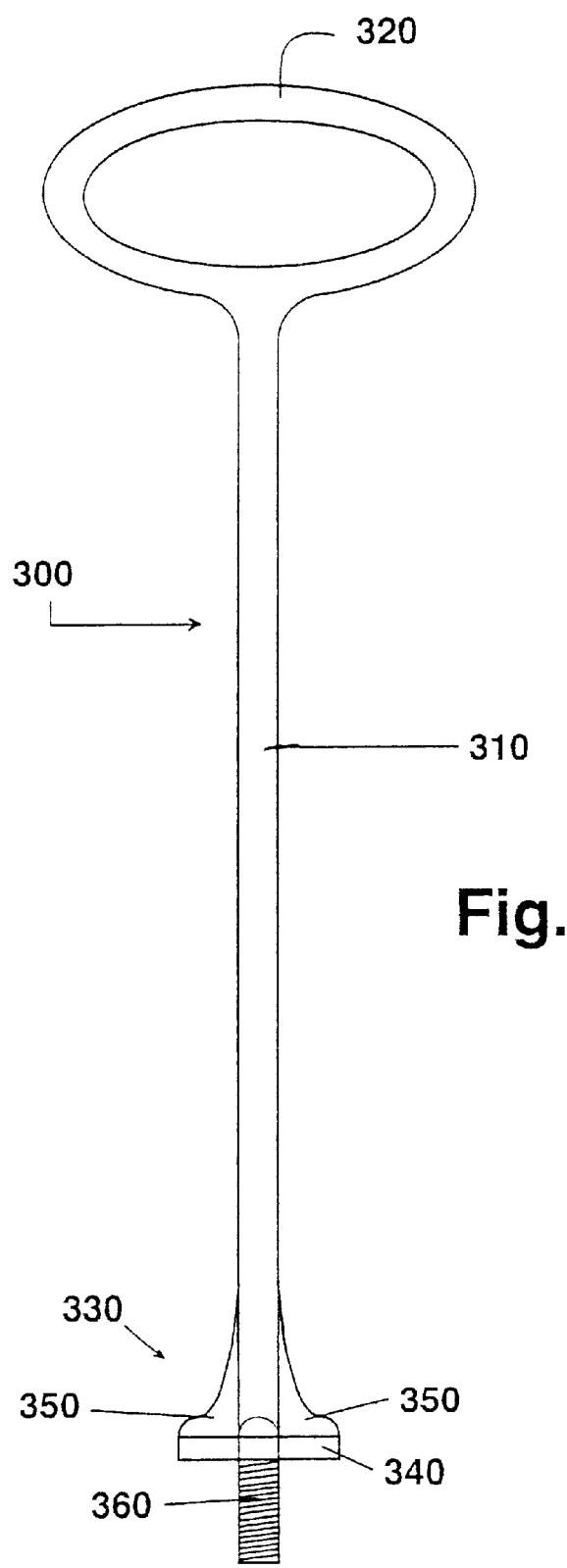
FIG. 2 shows a side view of the skimmer basket handle of the present invention.

FIG. 1 also depicts skimmer basket handle 300 of the present invention attached to skimmer basket 210 within skimmer well 200. FIG. 2 depicts a side view of skimmer basket handle 300. Handle 300 comprises column 310 in which the top end of column 310 is formed into grip 320 that may be easily grasped by hand. Column 310 has sufficient length to position grip 320 of handle 300 above the top of skimmer basket 210 and above the water level 120, when handle 300 is attached to skimmer basket 210.

Figure 3:
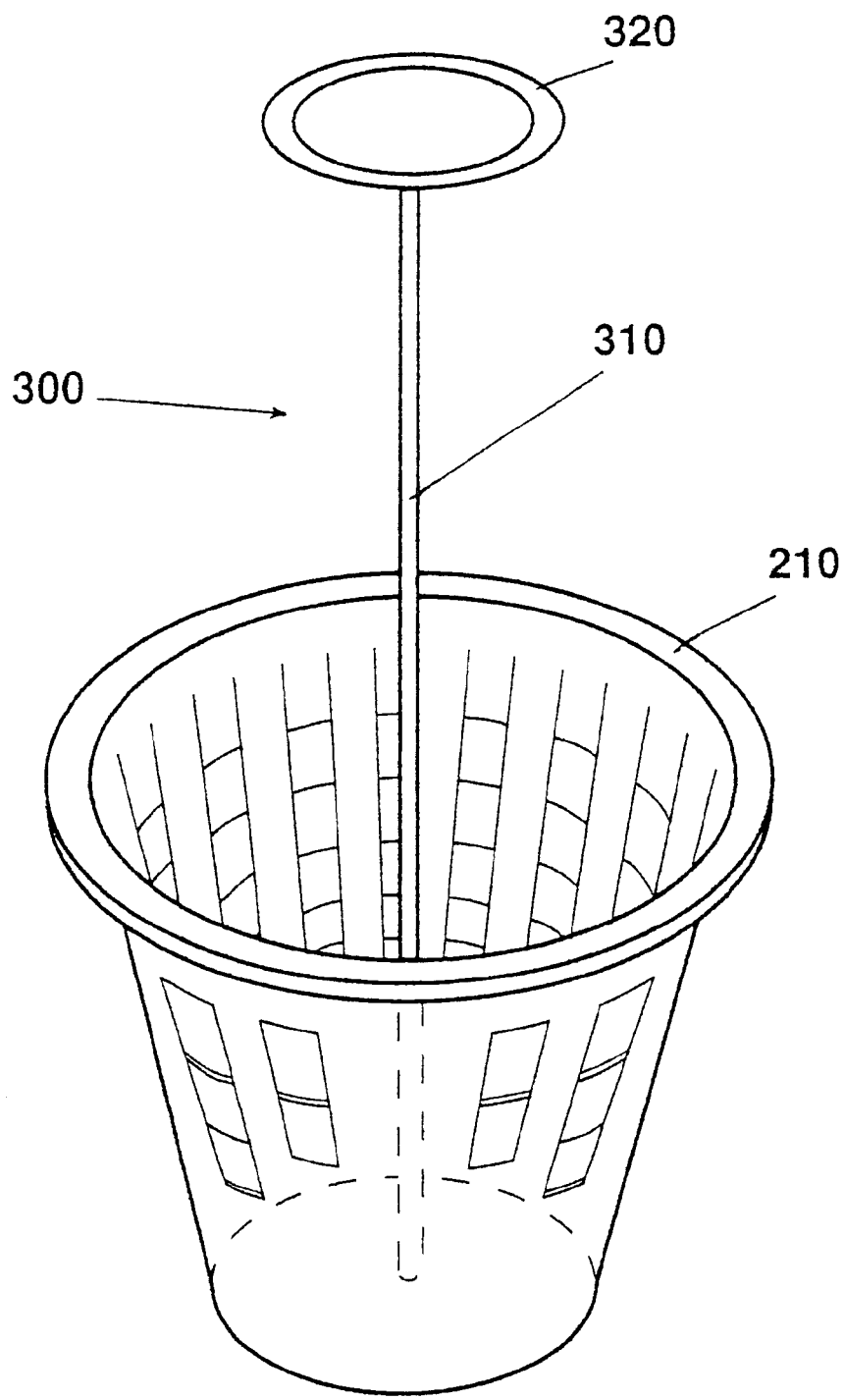
FIG. 3 shows a perspective view of the skimmer basket handle of the present invention attached to a skimmer basket.
Figure 4:
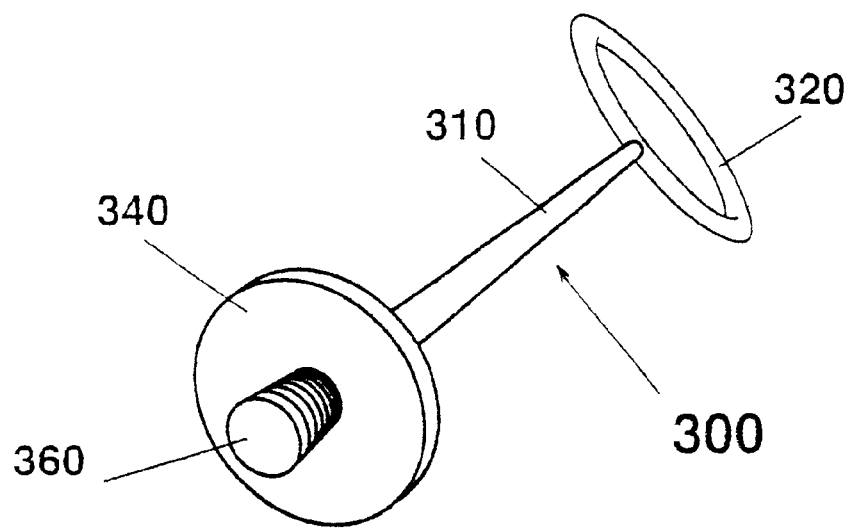
FIG. 4 shows a perspective view of the skimmer basket handle of the present invention from the bottom of the handle towards the top of the handle.
Figure 5:
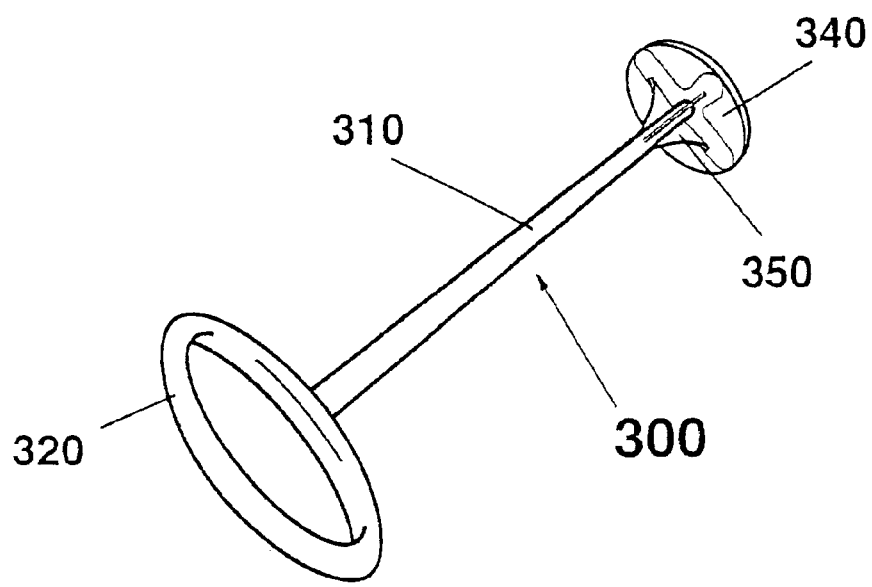
FIG. 5 shows a perspective view of the skimmer basket handle of the present invention from the top of the handle towards the bottom of the handle.

FIG. 3 shows how handle 300 is disposed within skimmer basket 210 when handle 300 is attached to skimmer basket 210. FIG. 4 shows a perspective view of handle 300 from the bottom of the handle towards the top of the handle. FIG. 5 shows a perspective view of handle 300 from the top of the handle towards the bottom of the handle.

Figure 6:
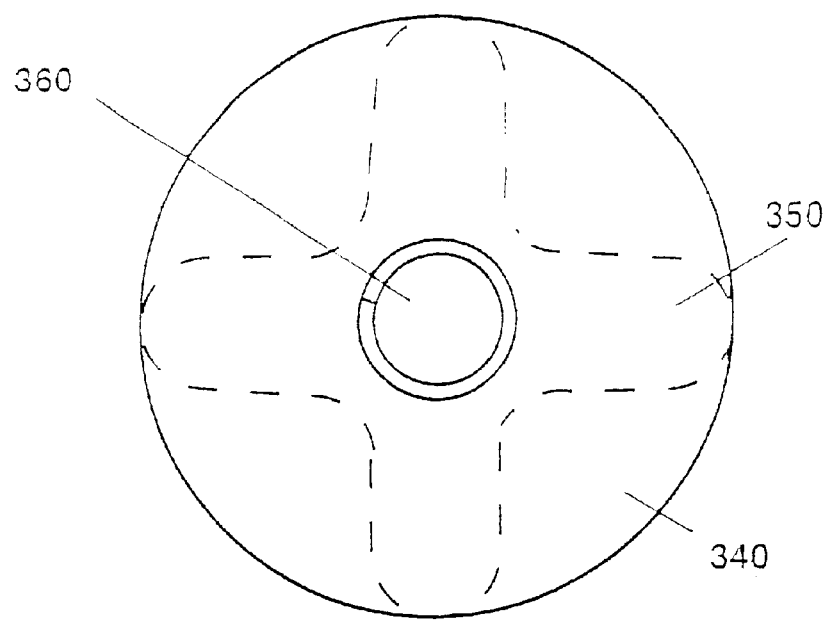
FIG. 6 shows a bottom plan view of the flange of the skimmer basket handle of the present invention.

The lower end of handle 300 is formed into flange portion 330 as shown in FIG. 2. Flange portion 330 comprises flange base 340 disposed approximately perpendicularly to column 310. In an advantageous embodiment of the invention, the lower end of handle 300 is formed into braces 350 between column 310 and flange base 340. Braces 350 support column 310 and provide additional strength to the lower end of handle 300. FIG. 6 shows a bottom view of handle 300 and flange base 340. Shown in dotted outline is the location of four braces 350 on four sides surrounding column 310.

Figure 7:
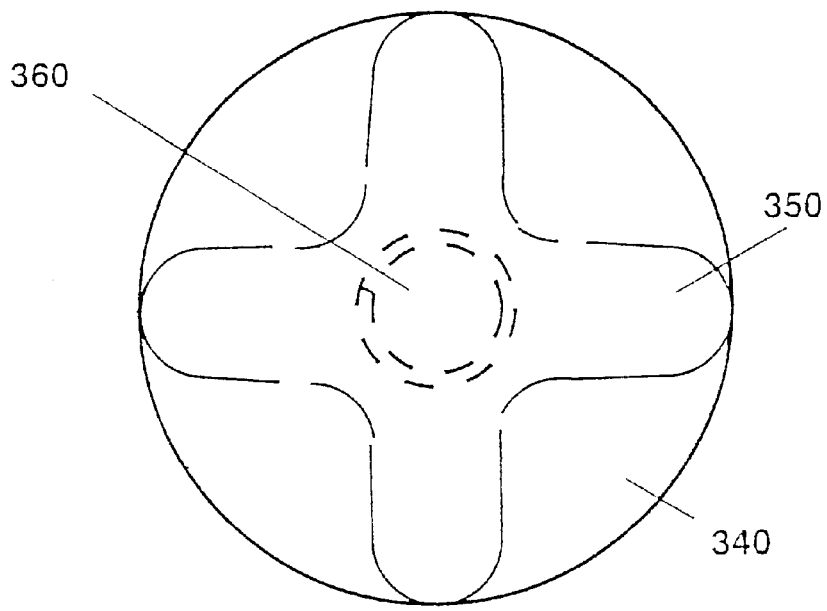
FIG. 7 shows a top plan view of the flange of the skimmer basket handle of the present invention.

The lower end of handle 300 is formed into end portion 360 capable of passing through an aperture in the bottom of skimmer basket 210. As shown in FIG. 2, end portion 360 is formed having a threaded portion adapted to receive a washer 370 and a fastener nut 390. In an advantageous embodiment of the invention, the threaded portion of end portion 360 extends from flange base 340 all the way to the end of end portion 360. A bottom view of end portion 360 is shown in FIG. 6. Additionally, FIG. 7 shows a top plan view of flange base 340. Shown in solid outline is the location of four braces 350 on four sides surrounding column 310. The dotted outline in FIG. 7 represents threaded end portion 360 adapted to receive washer 370 and fastener nut 390.

To attach handle 300 to skimmer basket 210, a user prepares skimmer basket 210 by drilling an aperture in the bottom of skimmer basket 210. The aperture must be made large enough to receive end portion 360 of handle 300. The user then places end portion 360 of handle 300 through the aperture and moves flange base 340 into contact with the top surface of the bottom of skimmer basket 210. Handle 300 is then secured to skimmer basket 210 by placing a washer 370 over threaded end portion 360, and then threading fastener nut 390 on end portion 360. Fastener nut 390 is threaded up to the lower surface of washer 370 which applies pressure on the bottom of skimmer basket 210. After handle 300 has been attached to skimmer basket 210 in this matter, the combination of handle 300 and skimmer basket 210 appears as illustrated in FIG. 3.

When skimmer basket 210 equipped with handle 300 is located within skimmer well 200, it is very easy to remove skimmer basket 210 from skimmer well 200. The user simply grasps grip 320 of handle 300 and pulls upwardly on grip 320. This causes skimmer basket 210 to come quickly and easily up out of skimmer well 200 for cleaning. Unlike the case with prior art skimmer baskets, it is not necessary to reach down into the inside of skimmer basket 210 to grasp the sides of the skimmer basket or, if the skimmer basket is so equipped, any thin plastic flexible handles (not shown) which may have fallen into the inside of skimmer basket 210.

In an advantageous embodiment of the invention, the length of column 310 is selected so that grip 320 of handle 300 will be located beneath the top edge of skimmer well 200. This is so that skimmer well cover 230 may be placed into position over skimmer well 200 when the combination of handle 300 and skimmer basket 210 is in place within skimmer well 200.

In an advantageous embodiment of the invention, the threaded portion of end portion 360 extends from flange plate 340 to the end of end portion 360. This allows fastener nut 390 to be threaded up to and secured against washer 370 which presses against the lower surface of the bottom of skimmer basket 210. It is possible, however, to practice the invention even if the threaded portion covers less of end portion 360 than that described above.

Specifically, if the threaded portion of end portion 360 does not extend all the way up to flange base 340, fastener nut 390 can not be threaded up to and secured against the lower surface of the bottom of skimmer basket 210. Fastener nut 390 can only be threaded up to the place where the threaded portion of end portion 360 ends. However, even in such an arrangement handle 300 can still lift skimmer basket 210. Handle 300 would begin to lift skimmer basket 210 after fastener nut 390 had been lifted into contact with the lower surface of the bottom of skimmer basket 210 as handle 300 was lifted.

In an alternate embodiment of the invention, end portion 360 may have a hole in it (not shown) to receive a conventional locking mechanism such as a cotter pin (not shown). In this embodiment of the invention, end portion 360 is placed though the previously described aperture in the bottom of skimmer basket 210. Handle 300 is then secured to skimmer basket 210 by placing a cotter pin (not shown) through the hole in end portion 360.

In another embodiment of the present invention, the aperture drilled in skimmer basket 210 may be threaded on the inner surface of the aperture. In such an embodiment, handle 300 may be screwed into place in skimmer basket 210 without the need for a fastener nut or a cotter pin.

In an advantageous embodiment of the invention, the length of column 310 is selected so that grip 320 of handle 300 will be located beneath the top edge of skimmer well 200. This is so that skimmer well cover 230 may be placed into position over skimmer well 200 when the combination of handle 300 and skimmer basket 210 is in place within skimmer well 200.

Figure 8:
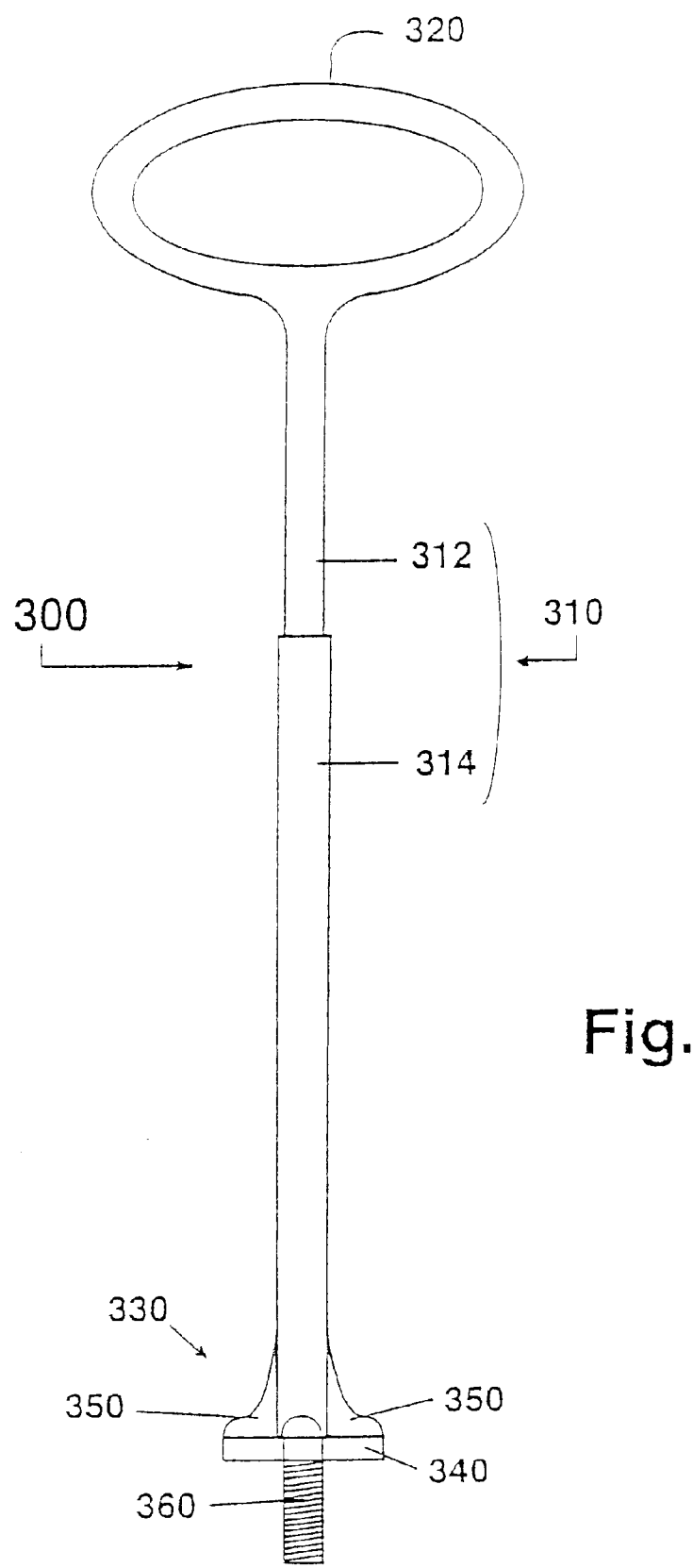
FIG. 8 shows a side view of an alternative embodiment of the skimmer basket handle of the present invention showing a telescoping column in the handle.

FIG. 8 shows an alternative embodiment of skimmer basket handle 300 of the present invention. In the alternative embodiment, column 310 comprises handle column 312 and hollow column 314 for receiving handle column 312 within the central hollow portion of hollow column 314. The top end of handle column 312 is formed into grip 320 that may be easily grasped by hand. The lower end of handle column 312 is slidably disposed within hollow column 314 and may be moved upwardly or downwardly with respect to hollow column 314. In this manner, the position of grip 320 with respect to flange base 340 can be selected within a range of positions. When handle column 312 has been moved to a selected position within hollow column 314, a conventional locking mechanism (not shown) is engaged to fasten handle column 312 to hollow column 314. For example, the conventional locking mechanism may be a cotter pin (not shown) placed through corresponding apertures (not shown) in column 312 and hollow column 314.

The telescoping feature of handle column 312 within hollow column 314 allows handle 300 to have a variable length. This allows handle 300 to be used in different sized skimmer wells 200.

In an alternate embodiment of the present invention, handle column 312 may be spring mounted on a spring (not shown) disposed inside hollow column 314. This spring mounted arrangement allows grip 320 to spring upward toward a user when skimmer well cover 230 is removed.

It is also possible, however, to practice the invention even if the user does not desire to drill an aperture in the bottom of skimmer basket 210. Threaded end portion 360 can be removed from handle 300 and the remaining flat portion of the surface of the flange 340 can be affixed with a marine grade epoxy capable of adhering to plastic surfaces. In this way handle 300 can be adhered to the base of skimmer basket 210.

Skimmer basket 210 may be manufactured with a plastic or ceramic weight in the bottom of the basket. This is done to add weight to the basket. Handle 300 can be adhered directly to a weight in the bottom of skimmer basket 210 by removing threaded end portion 360 and applying epoxy as described above.

A particular skimmer well 200 may have sufficient clearance between the top of flow valve 140 and the bottom of skimmer basket 210 so that fastener nut 390 will not touch flow valve 140. This case is illustrated in FIG. 1. However, there are some skimmer wells 200 that do not have sufficient clearance for fastener nut 390. Lack of sufficient clearance would cause fastener nut 390 to rest upon the top of flow value 140 and cause skimmer basket 210 to not be properly seated in skimmer well 200. For such skimmer wells 200 the skimmer basket handle 300 of the present invention must be attached so that skimmer basket 210 does not have any obstruction (such as fastener nut 390) extending beneath the bottom of skimmer basket 210.

As will be described more fully below, the present invention solves this problem with a reversible weight 500 that may be attached to skimmer basket 210 in two different configurations. Attaching reversible weight 500 to skimmer basket 210 in the first configuration allows fastener nut 390 to extend beneath the bottom of skimmer basket 210. Attaching reversible weight 500 to skimmer basket 210 in the second configuration allows fastener nut 390 to be located above the bottom of skimmer basket 210 so that fastener nut 390 will not be an obstacle that would rest upon flow valve 140.

Figure 9:
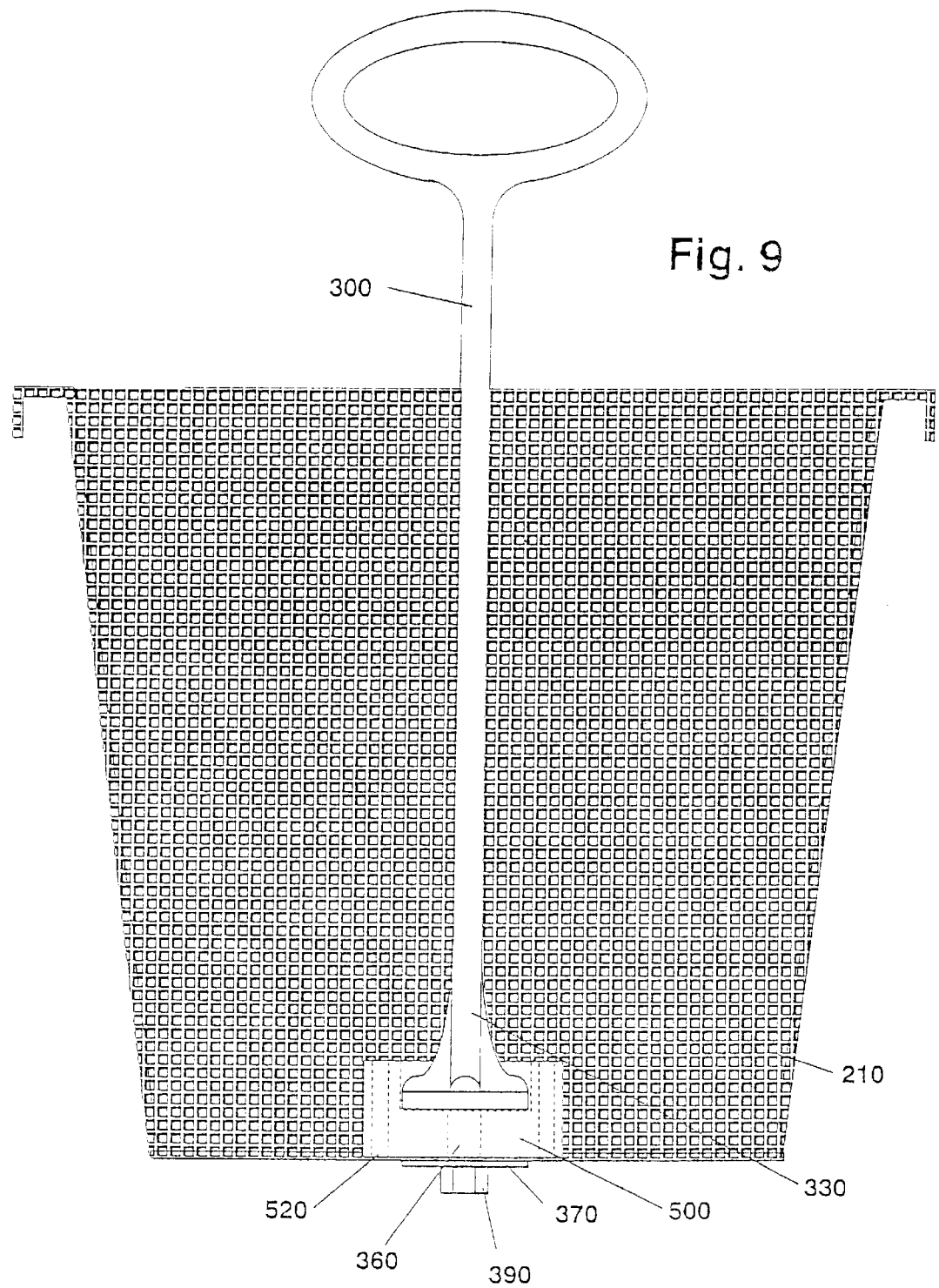
FIG. 9 shows a cross sectional view of the skimmer basket handle and the reversible weight of the present invention in a first configuration where the skimmer basket handle and the reversible weight are attached to a skimmer basket with a nut and a washer.
Figure 10:
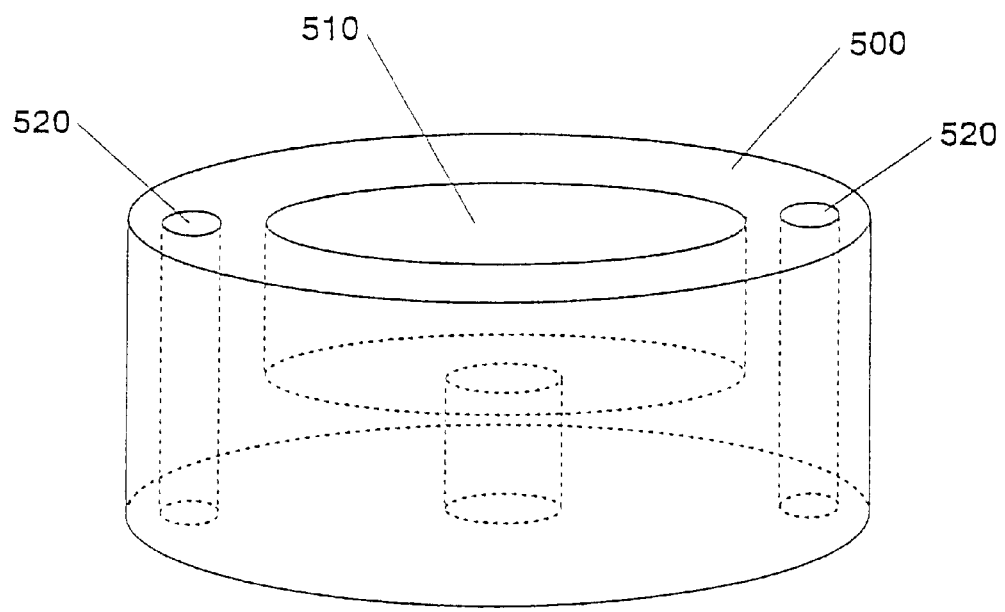
FIG. 10 shows a perspective top view of the skimmer basket reversible weight of the present invention where the reversible weight is positioned to be attached to a skimmer basket in a first configuration.
Figure 11:
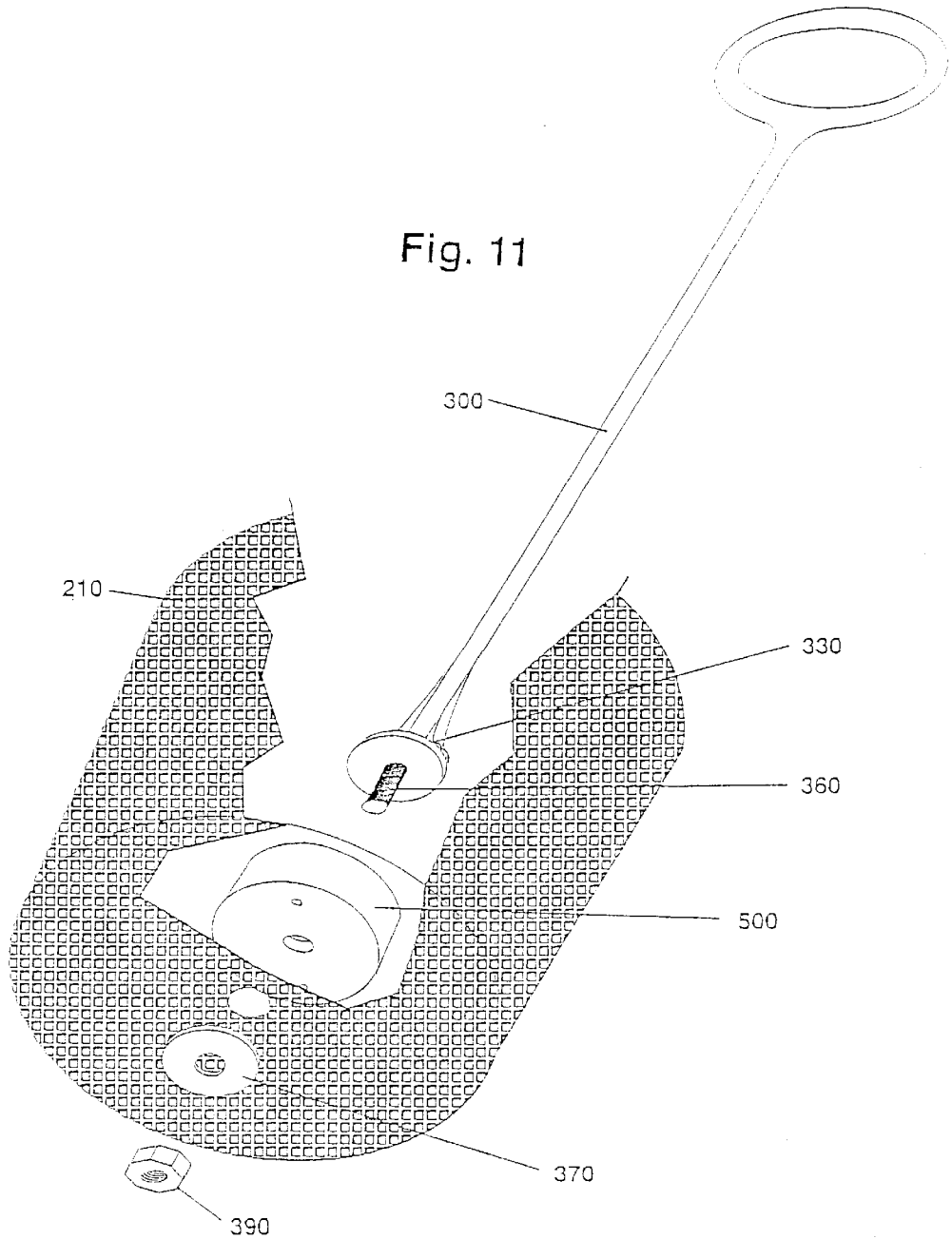
FIG. 11 shows a perspective exploded view of the skimmer basket handle and reversible weight of the present invention in a first configuration where the skimmer basket handle and the reversible weight are attached to a skimmer basket with a nut and a washer.
Figure 12:
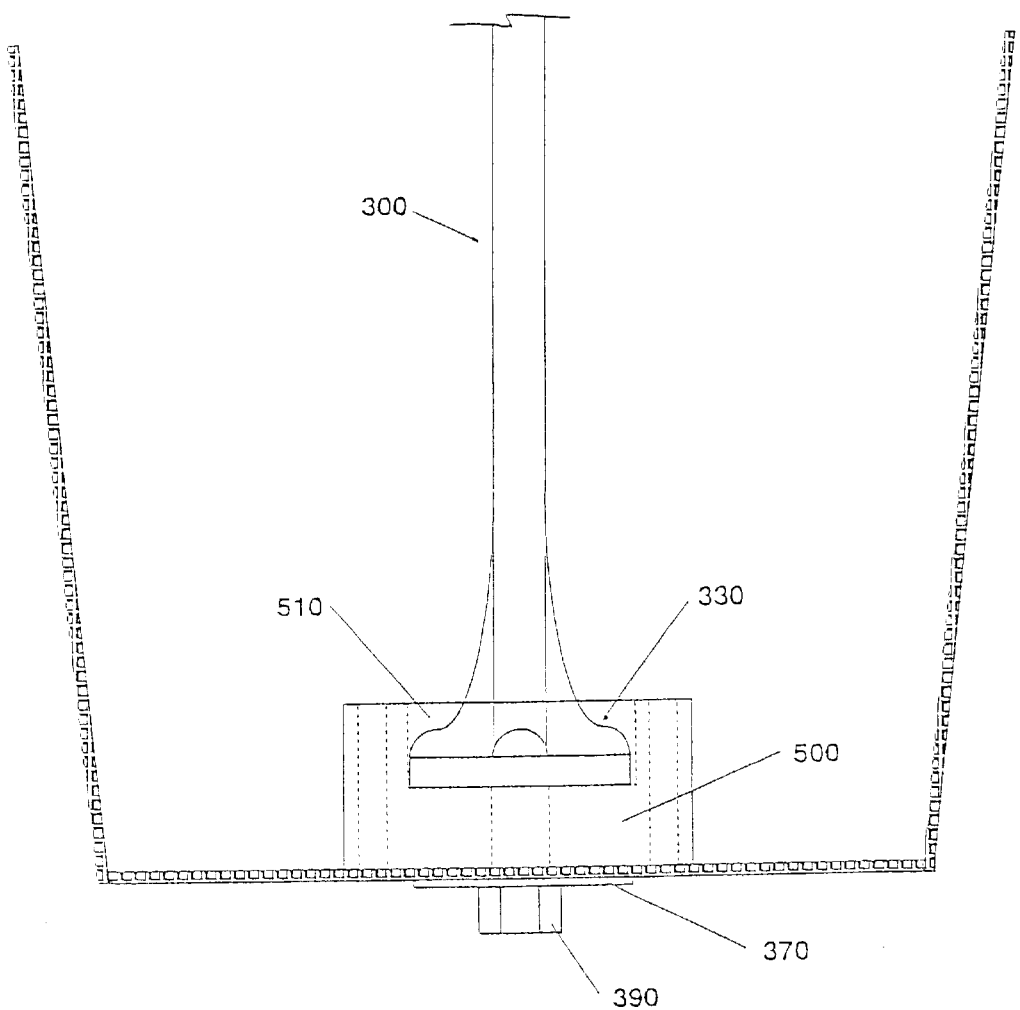
FIG. 12 shows a detailed cross sectional view of a portion of the skimmer basket handle and the reversible weight of the present invention in a first configuration where the skimmer basket handle and the reversible weight are attached to a skimmer basket with a nut and washer.
Figure 13:
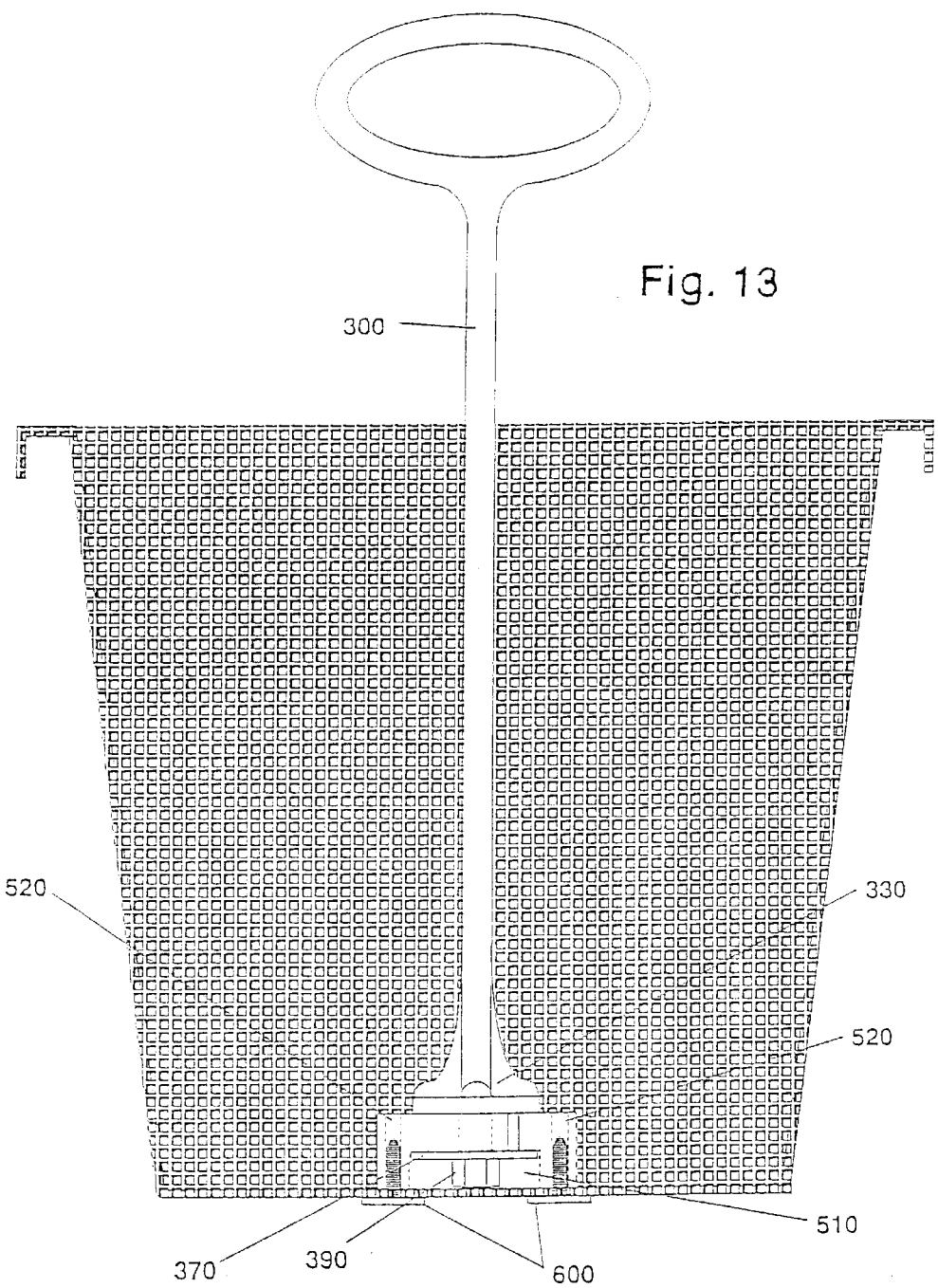
FIG. 13 shows a cross sectional view of the skimmer basket handle and the reversible weight of the present invention in a second configuration where the skimmer basket handle and the reversible weight are attached to a skimmer basket with two fasteners.
Figure 14:
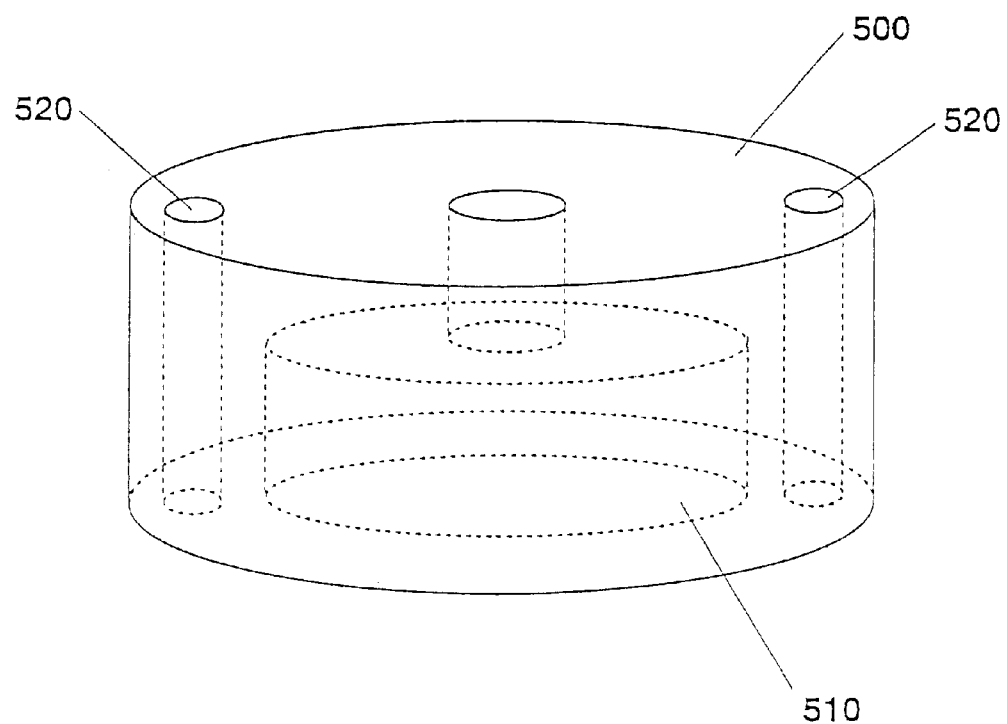
FIG. 14 shows a perspective top view of the skimmer basket reversible weight of the present invention where the reversible weight is positioned to be attached to a skimmer basket in a second configuration.
Figure 15:
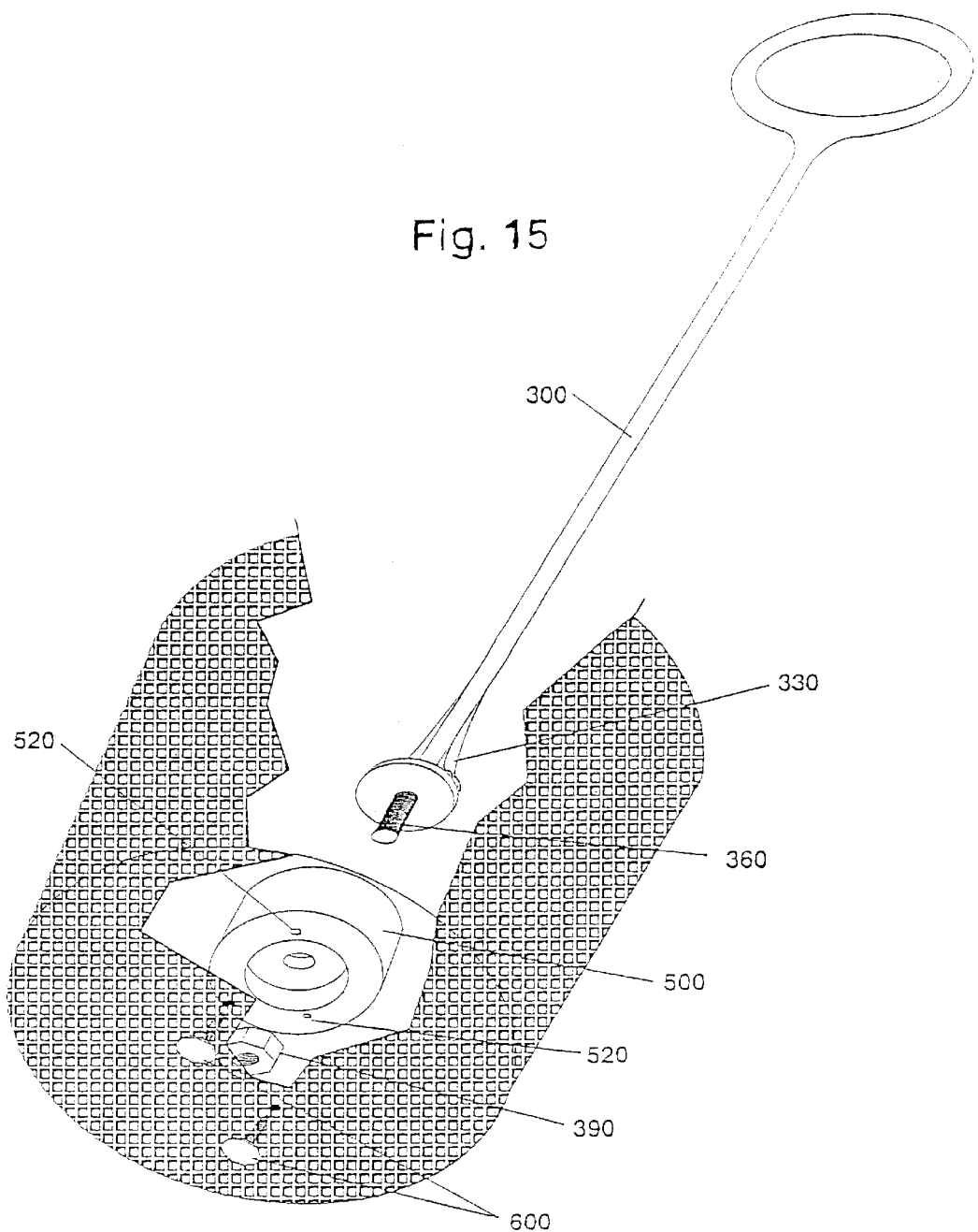
FIG. 15 shows a perspective exploded view of the skimmer basket handle and reversible weight of the present invention in a second configuration where the skimmer basket handle and the reversible weight are attached to a skimmer basket with two fasteners.
Figure 16:
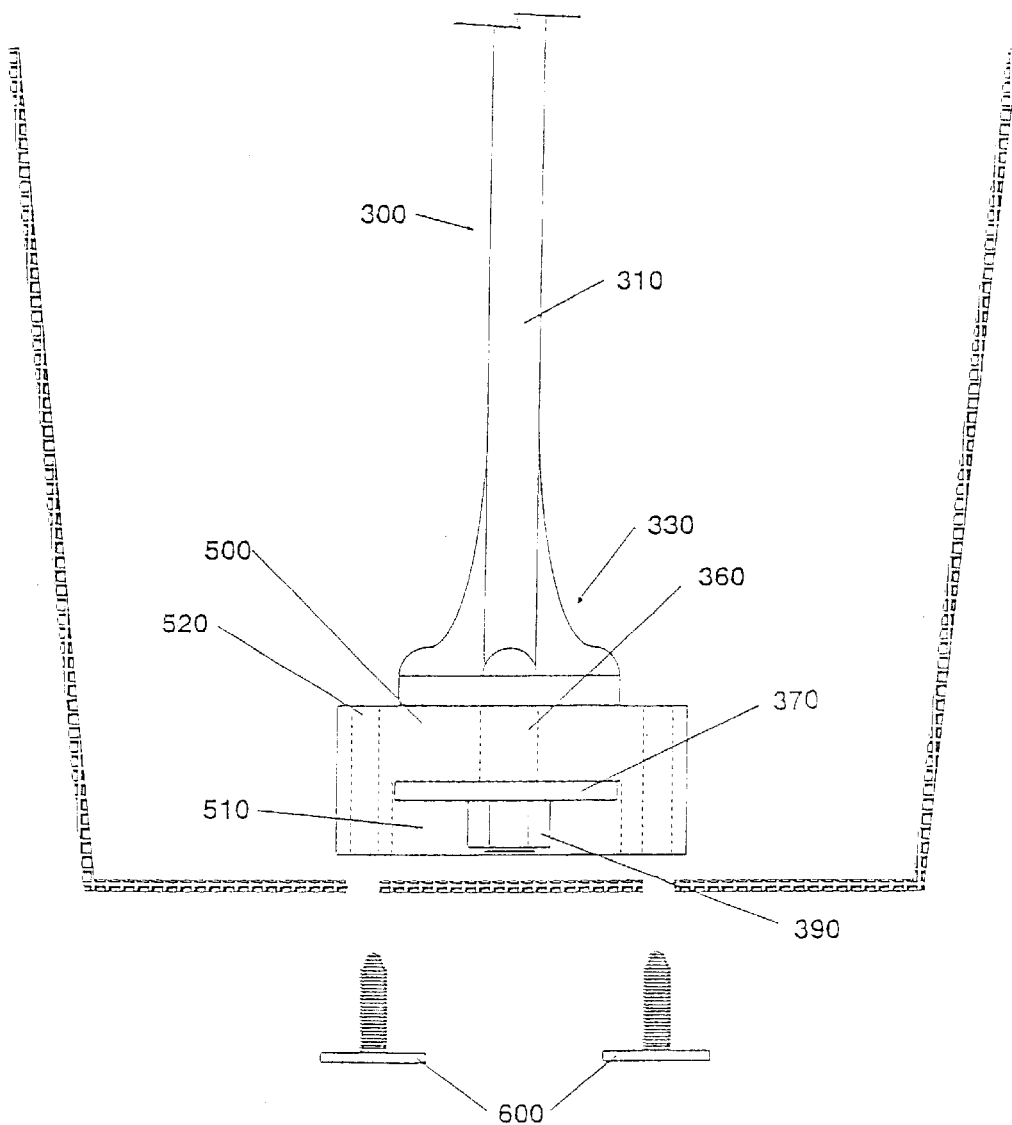
FIG. 16 shows a detailed cross sectional view of a portion of the skimmer basket handle and the reversible weight of the present invention in a second configuration where the skimmer basket handle and the reversible weight are attached to a skimmer basket with two fasteners.

FIGS. 9 through 12 show an alternate advantageous embodiment of the invention, in which a reversible weight 500 is designed to allow the flange portion 330 of handle 300 to fit into recess 510 formed within reversible weight 500. As shown in FIG. 10, reversible weight 500 is preferably formed with cylindrical symmetry. Cylindrically symmetrical recess 510 receives cylindrically symmetrical flange portion 330 as shown in FIG. 9 and FIG. 12. Reversible weight 500 is preferably formed of a high density material to provide a high weight to volume ratio.

Reversible weight 500 also has portions that form an aperture in the center of reversible weight 500 to accommodate threaded end portion 360 of handle 300. Threaded end portion 360 is placed through the aperture in the center of reversible weight 500 and through the aperture in the bottom of skimmer basket 210. Threaded end portion 360 extends below the bottom of skimmer basket 210 where washer 370 and fastener nut 390 may be secured on the end of threaded end portion 360. In this manner reversible weight 500 is secured to the interior bottom of the skimmer basket. This is the first configuration of reversible weight 500.

FIGS. 13 through 16 describe an alternate advantageous embodiment of the invention, where reversible weight 500 is turned over from the position it occupied in FIGS. 9 to 12. In this embodiment of the invention flange portion 330 of handle 300 rests on top of reversible weight 500.

Threaded end portion 360 is passed through the aperture in the center of reversible weight 500. Threaded end portion 360 extends into recess 510 where washer 370 and fastener nut 390 are fastened to the end of threaded end portion 360. The dimensions of recess 510 are chosen so that when washer 370 and fastener nut 390 have been fastened to threaded end portion 360 the bottom of threaded end portion 360 does not extend beyond the bottom of reversible weight 500. This is the second configuration of reversible weight 500.

In this alternative embodiment of the invention, reversible weight 500 is securely connected to handle 300. Handle 300 with reversible weight 500 is then attached to skimmer basket 210. This may be done by using a marine grade epoxy and adhering the bottom of reversible weight 500 to the bottom of skimmer basket 210. This may also be done by fastening the bottom of reversible weight 500 to the bottom of skimmer basket 210 with fasteners. In an advantageous embodiment of the invention, the fasteners are two one-way plastic dart fasteners 600. Fasteners 600 may be placed through holes drilled in the bottom of the skimmer basket 210. Fasteners 600 may also be placed through standard skimmer basket strainer holes that are already present in the bottom of skimmer basket 210.

As shown in FIGS. 9 to 16, reversible weight 500 is formed having portions that define apertures 520 for receiving two fasteners 600 of the type described. If apertures 520 in reversible weight 500 are formed as threaded apertures, then threaded screws (not shown) could be used as fasteners instead of the one-way plastic dart fasteners. Other types of fasteners could also be used.

Figure 17:
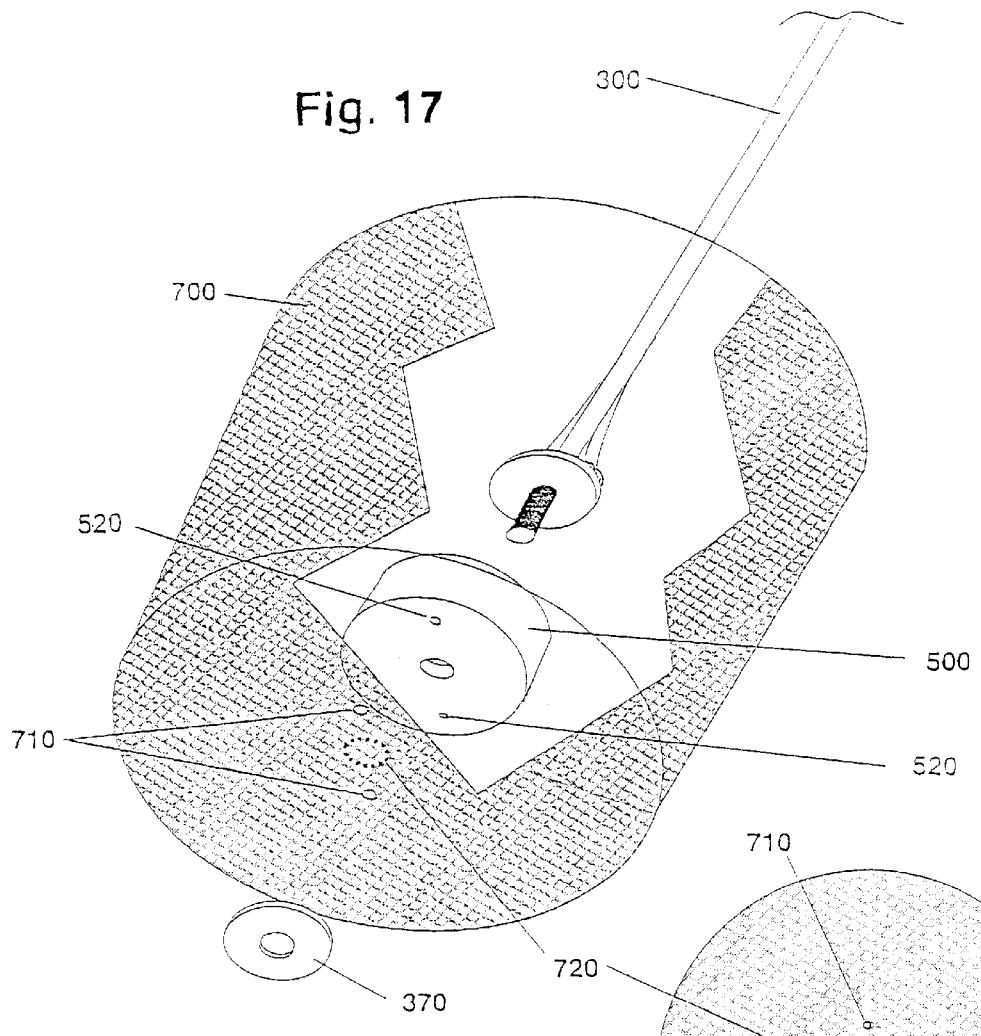
FIG. 17 shows a perspective exploded view of the skimmer basket handle and the reversible weight of the present invention attached to a custom molded skimmer basket designed to receive two fasteners and a threaded portion of the skimmer basket handle through a knockout section in the bottom of the skimmer basket.
Figure 18:
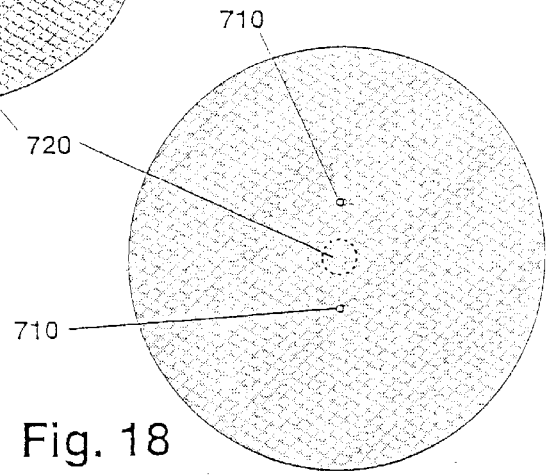
FIG. 18 shows an end view of the custom molded skimmer basket shown in FIG. 17 showing the location of two apertures for fasteners and showing the location of a knockout section in the bottom of the skimmer basket.

In an alternate embodiment of the invention, FIGS. 17 and 18 show a custom molded skimmer basket 700 with two molded or previously drilled apertures 710 aligned to match up with the two apertures 520 in reversible weight 500. Skimmer basket handle 300 (with or without reversible weight 500) can be secured to the bottom of custom molded skimmer basket 700 by inserting the two fasteners 600 through the molded or previously drilled holes 710 and into the apertures 520 of reversible weight 500. As an alternative to using fasteners 600, the skimmer basket handle 300 (with or without reversible weight 500) can be glued to the bottom of skimmer basket 210 using marine epoxy.

FIGS. 17 and 18 also show a quick connect feature in that the bottom center of custom molded skimmer basket 700 has been formed with a spot 720 that is easy to knock out and remove. This feature allows the user to easily create an aperture in the bottom of custom molded skimmer basket 700 and insert threaded end portion 360 of handle 300 through reversible weight 500 and the bottom of the custom molded skimmer basket 700. Handle 300 and reversible weight 500 both would then be secured to the bottom of custom molded skimmer basket 700 by slipping washer 370 over threaded end portion 360 and using fastener nut 390 to apply pressure to hold the parts together.

In a large swimming pool 100 a skimmer well 200 may be relatively deep. In such cases the length of skimmer pool basket handle column 310 must be long enough to position grip 320 of handle 300 above the top of skimmer basket 210 and above the water level 120. As will be described more fully below, an extension for skimmer basket handle column 310 may be formed to increase the length of handle column 310.

In an alternate embodiment of the present invention, FIGS. 19 to 20 show a version of skimmer basket handle 300 that has been formed so that there are lateral extensions 900 on the side of column 310. Lateral extensions 900 on column 310 may be interlocked with other similar lateral extensions on other handle columns. FIG. 21 shows a front view of this alternate embodiment of the skimmer basket handle and shows a location 905 where the handle column 310a may be cut to form a base handle 910. FIG. 22 also shows front view of this alternate embodiment of the skimmer basket handle and shows a location 907 where the handle column 310b may be cut form an extension handle 920.

Figure 23:
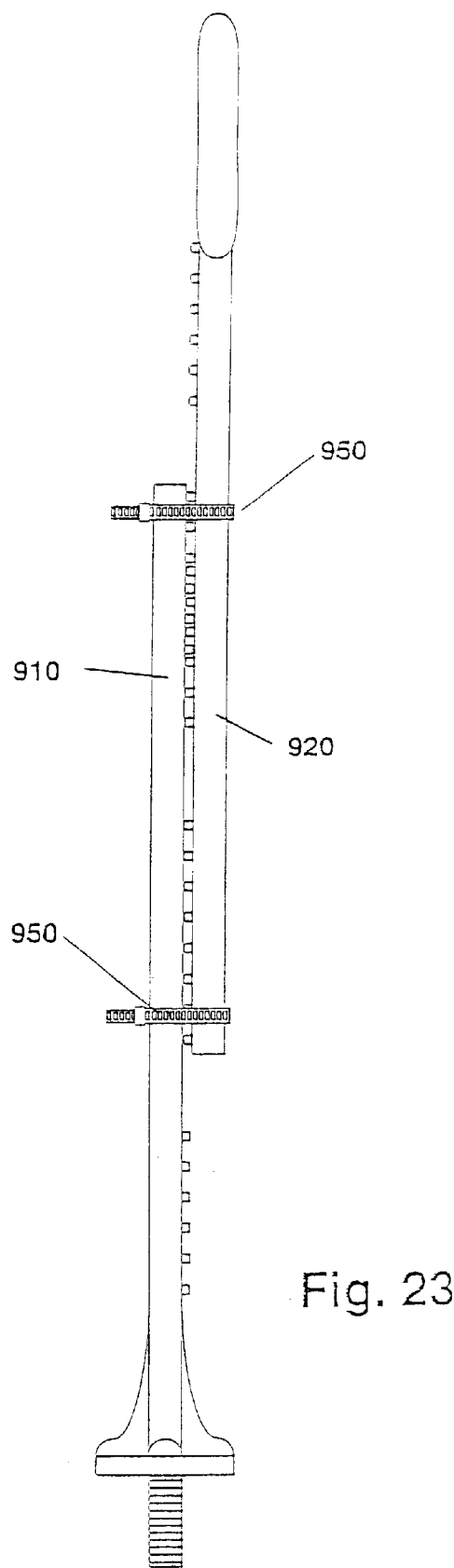
FIG. 23 shows a side view of the interlocking of the lateral extensions on the side of a base handle that has been cut as shown in FIG. 21 with the lateral extensions on the side of an extension handle that has been cut as shown in FIG. 22.

When base handle 910 and extension handle 920 are placed together as shown in FIG. 23, lateral extensions 900 of base handle 910 and the lateral extensions 900 of extension handle 920 interlock. A connector 950 is used to bind together base handle 910 and extension handle 920 so that the interlocked lateral extensions 900 remain connected. FIG. 23 shows an embodiment of the present invention where connector 950 comprises two plastic ties for securing together base handle 910 and extension handle 920.

Figure 24:
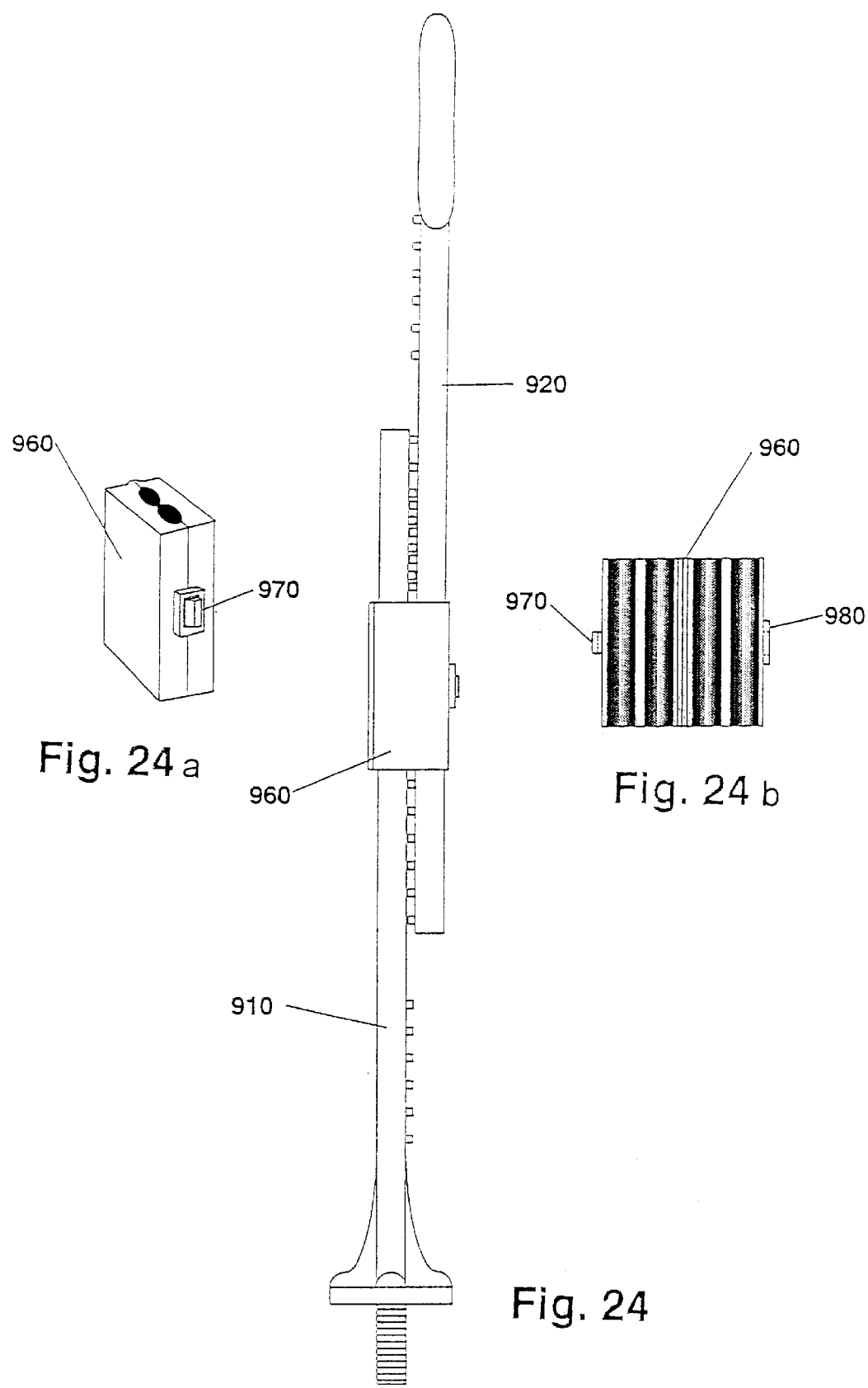
FIG. 24 shows a side view of the interconnection of an alternative embodiment of the skimmer basket handles as shown in FIG. 23 in which the extension handle is secured to the base handle by a formed clip.

FIG. 24 shows an alternate embodiment of the present invention where connector 950 is a hinged locking clip 960. Hinged locking clip 960 is formed having portions that define a first channel for receiving the handle column of base handle 910 and having portions that define a second channel for receiving the handle column of extension handle 920. FIG. 24a shows hinged locking clip 960 in a closed position. FIG. 24b shows hinged locking clip 960 in an open position.

When hinged locking clip 960 is closed around the column of base handle 910 and around the column of extension handle 920, hinged locking clip 960 encloses the column of base handle 910 within the first channel and encloses the column of extension handle 920 within the second channel. The two halves of hinged locking clip 960 are then locked together by coupling locking tab 970 and locking catch 980. Although locking clip 960 has been shown and described as a hinged locking clip, it is clear that it is possible to use a locking clip 960 with two separate non-hinged sides (not shown) and two separate locking mechanisms (not shown) for locking together the two separate non-hinged sides.

Figure 25:
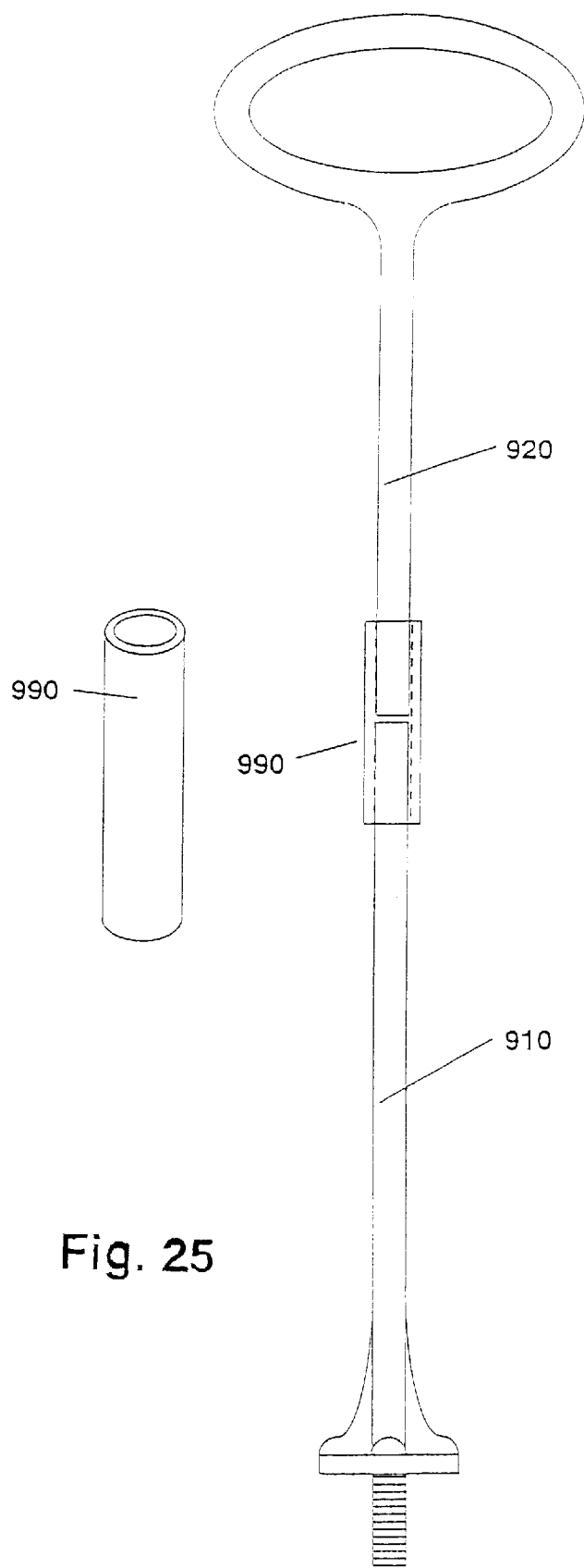
FIG. 25 shows a side view of the interconnection of an alternative embodiment of the skimmer basket handles as shown in FIG. 23 in which the extension handle is secured to the base handle by a coupling tube.

FIG. 25 shows an alternate embodiment of the present invention where connector 950 is a hollow coupling 990 such as a plastic tube. In this embodiment the upper end of base handle 910 and the lower end of extension handle 920 are inserted into the opposite ends of coupling 990. The inner diameter of coupling 990 is chosen to be slightly less than the outer diameter of the ends of base handle 910 and extension handle 920. The radial stretching of coupling 990 that occurs when the ends of base handle 910 and extension handle 920 are inserted within hollow coupling 990 secures each of the inserted ends within hollow coupling 990. Hollow coupling 990 is designed to operate whether or not there are lateral extensions 900 on base handle 910 and extension handle 920.

Figure 28:
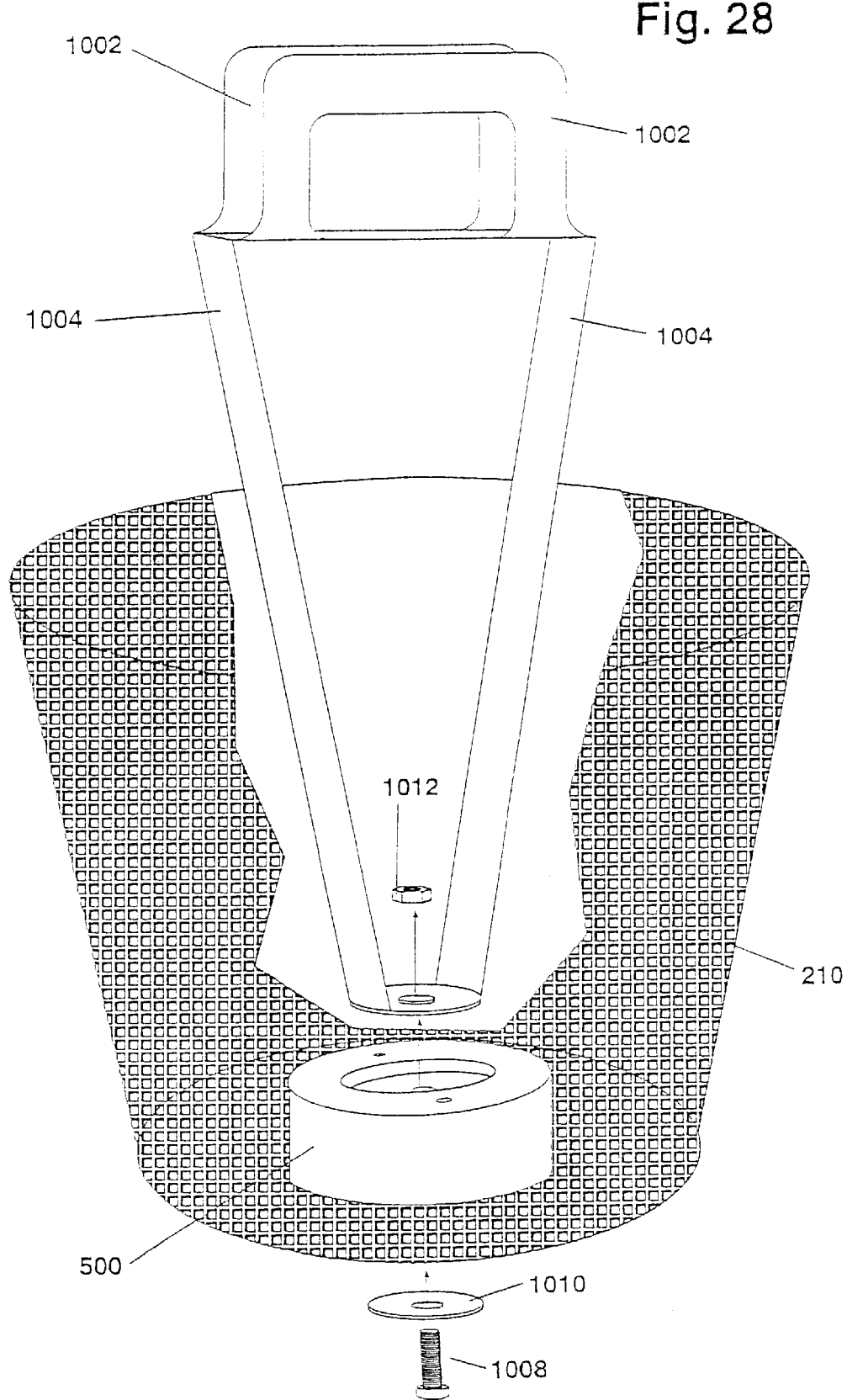
FIG. 28 shows a perspective exploded view of the alternate embodiment of the skimmer basket handle of the present invention shown in FIG. 27 showing the connection of the skimmer basket handle to a skimmer basket.

FIGS. 26 through 28 describe an alternate advantageous embodiment of the invention in which skimmer well basket handle 300 is formed from a strip 1000 of flexible material such as plastic. As shown in FIG. 26, strip 1000 is formed as a flat strip having two grips 1002 in the central portion of strip 1000 and two legs 1004 that extend outwardly from the central portion of strip 1000. The end of each leg 1004 is formed into a connector pad 1006 having portions that form an aperture through connector pad 1006.

As shown in FIGS. 27 and 28, the legs 1004 are folded downward and the connector pads are folded inward until the apertures through the connector pads 1006 align. The skimmer basket handle strip 1000 may then be secured to a skimmer basket by passing a bolt 1008 through a washer 1010 and then through an aperture in the bottom of skimmer basket 210. Bolt is then passed through the two aligned apertures of the connector pads 1006. Bolt 1008 is then secured with a fastener nut 1012. This embodiment of the invention may also be used with reversible weight 500.

Although it is preferable to use two legs 1004 and two connector pads 1006 to practice the present invention, it is possible to practice the present invention with only one leg 1004 and one connector pad 1006 (and one grip 1002). It is also possible to use other methods to couple one leg 1004 to a skimmer basket 210. The present invention includes the use of at least one leg 1004 connected to a skimmer basket and is not limited to the use of two legs 1004.

Figure 29:
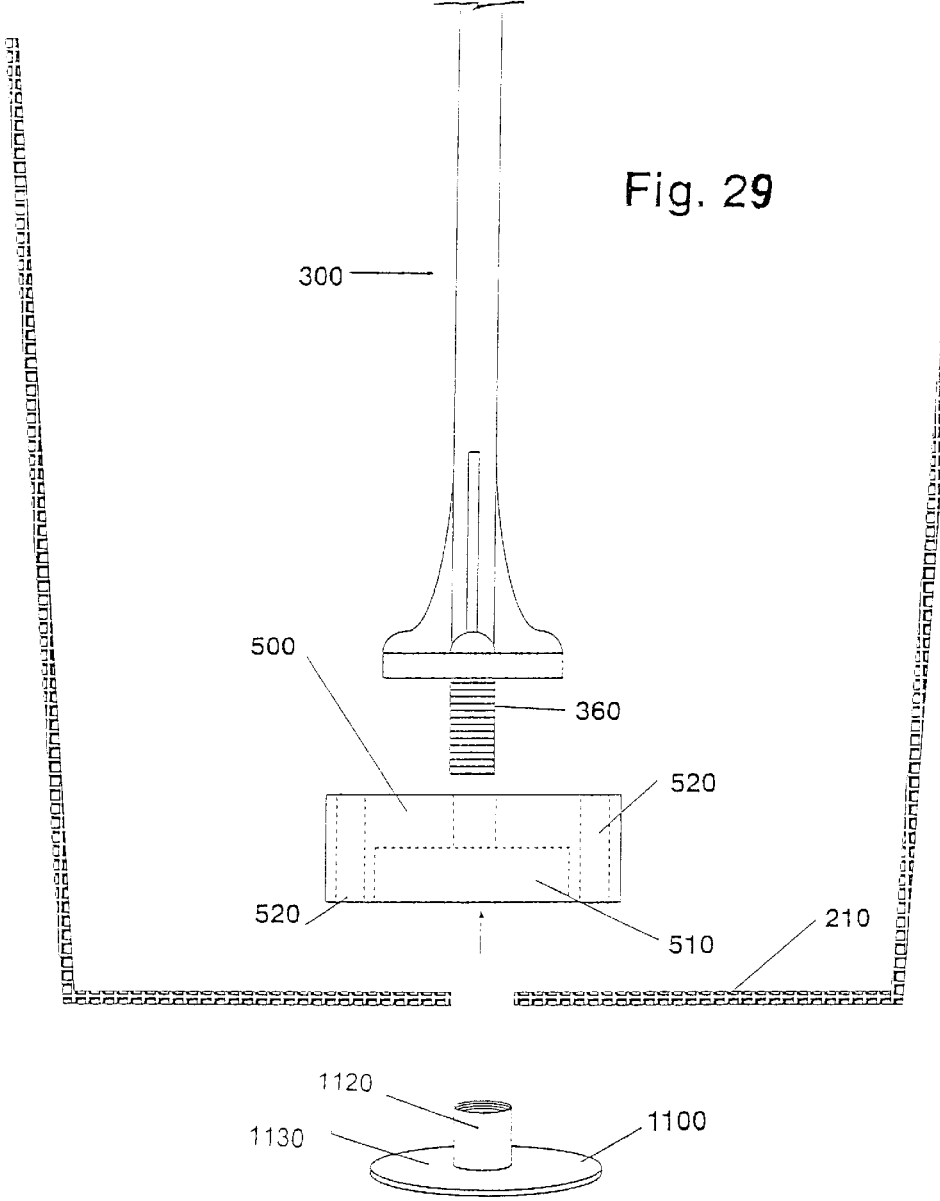
FIG. 29 shows a side view of an alternate embodiment of the skimmer basket handle of the present invention showing how the skimmer basket handle may be fastened to a skimmer basket with a threaded connector comprising a female threaded cup and a flange.

FIG. 29 shows an alternate advantageous embodiment of the present invention in which skimmer basket handle 300 is connected to skimmer basket 210 by a threaded connector 1100. Threaded connector 1100 comprises a female threaded cup 1120 fastened to a flange 1130. Female threaded cup 1120 fits through an aperture in the bottom of skimmer basket 210 and fits into recess 510 in reversible weight 500. Female threaded cup 1120 is then threaded onto end portion 360 of handle 300. As female threaded cup 1120 is threaded onto end portion 360 of handle 300, flange 1130 is urged into contact with the bottom of skimmer basket 210.

Figure 30:
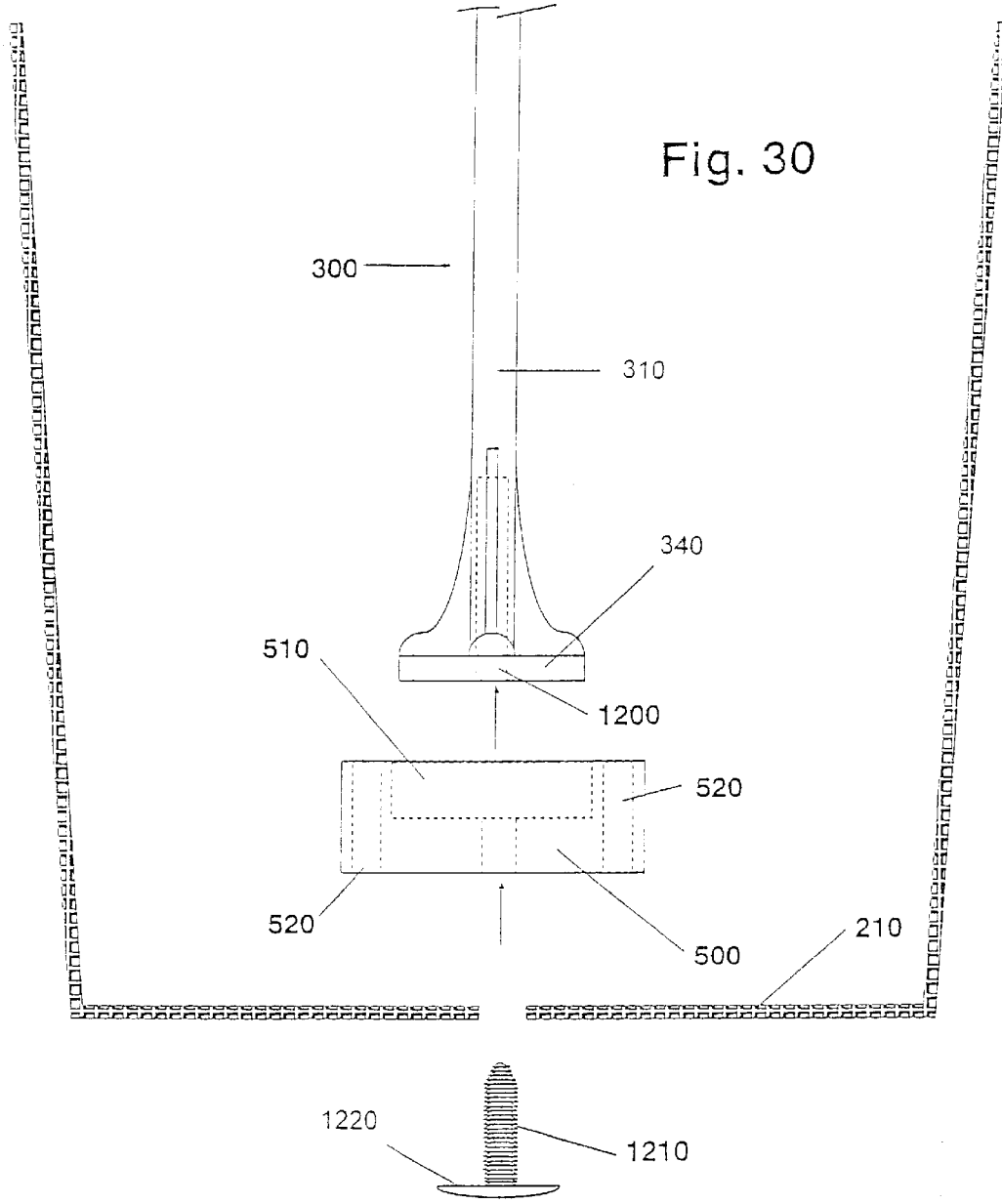
FIG. 30 shows a side view of an alternate embodiment of the skimmer basket handle of the present invention showing how the skimmer basket handle may be fastened to a skimmer basket with a fastener secured within a fastener aperture formed in the flange base and the column of the skimmer basket handle.

FIG. 30 shows an alternate advantageous embodiment of the present invention in which skimmer basket handle 300 is connected to skimmer basket 210 by a one-way plastic dart fastener 1210. Fastener 1210 fits through an aperture in the bottom of skimmer basket 210 and through recess 510 of reversible weight 500. As shown in FIG. 30, threaded end portion 360 of handle 300 has been removed in this embodiment of the invention and a fastener receptacle 1200 has been molded (or drilled) into flange base 340 and column 310 of handle 300. Fastener 1210 is pressed up into fastener receptacle 1200 to secure skimmer basket 210 to reversible weight 500 and handle 300. The head 1220 of fastener 1210 is urged into contact with the bottom of skimmer basket 210.

If fastener receptacle 1200 in flange base 340 and column 310 of handle 300 is formed as a threaded aperture, then a threaded screw (not shown) could be used as a fastener instead of the one-way plastic dart fastener 1210. Other types of fasteners could also be used.

Figure 31:
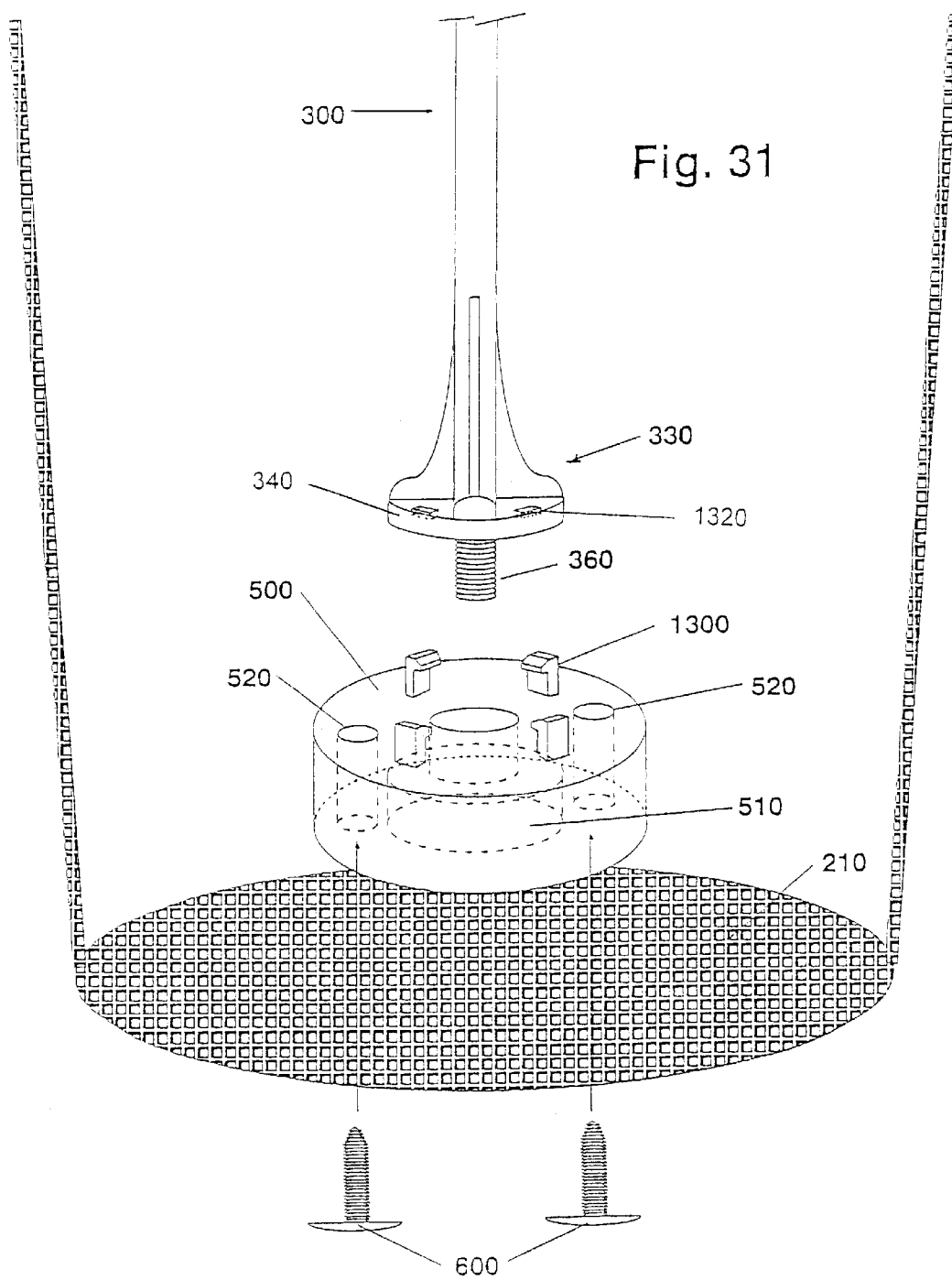
FIG. 31 shows a perspective view of an alternate embodiment of the skimmer basket handle of the present invention showing how the reversible weight may be provided with a plurality of fasteners for securing the flange base of the skimmer basket handle to the reversible weight.

FIG. 31 shows an alternate advantageous embodiment of the present invention in which skimmer basket handle 300 is connected to reversible weight 500 by plurality of fasteners 1300. Fasteners 1300 may either be custom molded into the top of reversible weight 500 or attached by conventional means such as screws (not shown). The fasteners 1300 shown in FIG. 31 are four fastener clips. But the invention is not limited to the use of only fastener clips. Other types of fasteners (such as bolts or screws) may be used. The invention is also not limited to the number of fasteners used.

Fastener clips 1300 are positioned on reversible weight 500 so that when flange base 340 of handle 300 is pressed down on top of reversible weight 500, the ends of fastener clips 1300 spread apart and then lock down the top portion of flange base 340 of handle 300 to reversible weight 500. As shown in FIG. 31, flange base 340 may be provided with correspondingly shaped recessions 1320 in the top of flange base 340 for receiving fastener clips 1300.

Reversible weight 500 and handle 300 can then be attached to skimmer basket 210 by pressing the two one-way fasteners 600 through apertures in the bottom of skimmer basket 210 and into the apertures 520 in reversible weight 500. Alternatively, as previously described, reversible weight 500 can be adhered to skimmer basket 210 with marine epoxy.

Although the present invention has been described in detail, those skilled in the art should understand that they can make various changes, substitutions and alterations herein without departing from the spirit and scope of the invention in its broadest form.

What is claimed is:

1. A handle capable of being attached to a skimmer basket, said handle having a column that positions a grip of said handle above the top of said skimmer basket when said handle is attached to said skimmer basket, wherein said handle has an end portion capable of passing through an aperture in the bottom of said skimmer basket, wherein said end portion of said handle has a threaded portion to receive a fastener nut after said end portion of said handle has passed through said aperture in the bottom of said skimmer basket.

2. A handle as set forth in claim 1 wherein said column of said handle comprises a handle column and a hollow column, said hollow column having portions forming a central hollow portion for receiving said handle column therein.

3. A handle as set forth in claim 2 wherein said handle column is slidably disposed within said hollow column for changing the length of said column and wherein said handle column is spring mounted within said hollow column for causing a grip on said handle column to move upwardly with respect to said hollow column.

4. A handle as set forth in claim 1 wherein said handle has a flange portion capable of abutting the top surface: of the bottom of said skimmer basket after said end portion of said handle has passed through said aperture in the bottom of said skimmer basket and wherein said threaded portion of said end portion of said handle extends from said flange portion of said handle to the end of said end portion of said handle.

5. A handle capable of being attached to a skimmer basket, said handle having a column that positions a grip of said handle above the top of said skimmer basket when said handle is attached to said skimmer basket wherein said handle has a threaded end portion capable of being screwed into a threaded aperture in the bottom of said skimmer basket.

6. A swimming pool skimmer assembly comprising:
   a skimmer basket; and
   a handle attached to said skimmer basket, said handle having a column that positions a grip of the handle above the top of said skimmer basket when said handle is attached to said skimmer basket wherein said handle has an end portion passed through an aperture in the bottom of said skimmer basket.

7. A swimming pool skimmer assembly as set forth in claim 6 wherein said handle has a flange portion abutting the top surface of the bottom of said skimmer basket.

8. A swimming pool skimmer assembly as set forth in claim 6 wherein said end portion of said handle has a threaded portion to receive a fastener nut.

9. A swimming pool skimmer assembly as set forth in claim 6 wherein said threaded end portion of said handle extends from said flange portion of said handle to the end of said end portion of said handle.

10. A swimming pool skimmer assembly as set forth in claim 6 wherein said column of said handle positions a grip of said handle above the top of the water level of said skimmer well when said skimmer basket is in said skimmer well and when said handle is attached to said skimmer basket.

11. A swimming pool skimmer assembly as set forth in claim 6 wherein said handle has a threaded end portion capable of being screwed into a threaded aperture in the bottom of said skimmer basket.

12. A swimming pool skimmer assembly as set forth in claim 6 wherein said column of said handle positions said grip of said handle beneath the top edge of a skimmer well when said skimmer basket is located within said skimmer well.

13. A handle capable of being attached to a skimmer basket, said handle having a column capable of positioning a grip of the handle above the top of said skimmer basket when said handle is attached to said skimmer basket and above the top of the water level in a skimmer well when said skimmer basket is in said skimmer well, said handle further capable of being attached to a weight that is capable of being attached to said skimmer basket.

14. A handle as set forth in claim 13 capable of being attached to a skimmer basket, said handle having a column of adjustable length capable of positioning said grip of said handle within a range of positions above the top of said skimmer basket when said handle is attached to said skimmer basket and above the top of the water level in a skimmer well when said skimmer basket is in said skimmer well.

15. A handle capable of being attached to a reversible weight that is capable of being attached to a skimmer basket, said handle having a column that positions a grip of said handle above the top of said skimmer basket when said handle is attached to said reversible weight and said reversible weight is attached to said skimmer basket.

16. A handle as set forth in claim 15 wherein said column positions said grip of said handle above the top of the water level in a skimmer well when said skimmer basket is in said skimmer well.

17. A handle as set forth in claim 15 wherein said handle has an end portion capable of passing through an aperture in said reversible weight and through an aperture in the bottom of said skimmer basket.

18. A handle as set forth in claim 17 wherein said handle has a flange portion capable of abutting said reversible weight after said end portion of said handle has passed through said aperture in said reversible weight.

19. A handle as set forth in claim 18 wherein said end portion of said handle has a threaded portion to receive a fastener nut after said end portion of said handle has passed through said aperture in said reversible weight.

20. A handle as set forth in claim 19 wherein said end portion of said handle has a threaded portion to receive a fastener nut after said threaded end portion has passed through an aperture in the bottom of said skimmer basket and after said threaded end portion has passed through an aperture in said reversible weight.

21. A handle as set forth in claim 15 wherein said reversible weight is formed having portions defining a recess on one side of said reversible weight for receiving a flange portion of said handle and is formed having portions defining an aperture through said reversible weight for receiving a threaded end portion of said handle.

22. A handle as set forth in claim 21 wherein said reversible weight is formed having portions defining apertures through said reversible weight for receiving fasteners to attach said reversible weight to said skimmer basket.

23. A swimming pool skimmer assembly comprising:
   a skimmer basket, and
   a handle having a threaded end portion passed through an aperture in a reversible weight and passed through an aperture in the bottom of said skimmer basket, wherein said handle is attached to said skimmer basket with a fastener nut threaded onto said threaded end portion of said handle,
   said handle having a column that positions a grip of said handle above the top of said skimmer basket when said handle is attached to said skimmer basket through said reversible weight.

24. A swimming pool skimmer assembly as set forth in claim 23 wherein the bottom of said skimmer basket has a knockout section which may be removed to create an aperture in the bottom of said skimmer basket to receive said threaded end portion of said handle.

25. A swimming pool skimmer assembly as set forth in claim 23 wherein said handle is attached to said skimmer basket with a threaded connector comprising a female threaded cup and a flange threaded onto said threaded end portion of said handle.

26. A swimming pool skimmer assembly comprising:
a skimmer basket, and
a handle having portions forming a fastener aperture within a flange base of said handle and within a column of said handle, wherein said handle is attached to said skimmer basket by passing a fastener through an aperture in the bottom of said skimmer basket and through an aperture in a reversible weight and by securing said fastener within said fastener aperture of said handle,
said handle having a column that positions a grip of said handle above the top of said skimmer basket when said handle is attached to said skimmer basket through said reversible weight.

27. A swimming pool skimmer assembly comprising:
a skimmer basket; and
a handle having a threaded end portion passed through an aperture in a reversible weight, wherein said handle is attached to said reversible weight with a fastener nut threaded onto said threaded end portion of said handle, and wherein said reversible weight is attached to the bottom of said skimmer basket,
said handle having a column that positions a grip of said handle above the top of said skimmer basket when said handle is attached to said reversible weight and said reversible weight is attached to said skimmer basket.

28. A swimming pool skimmer assembly as set forth in claim 27 wherein said reversible weight is attached to the bottom of said skimmer basket with fasteners that are passed through apertures in the bottom of said skimmer basket and that are secured within apertures in said reversible weight.

29. A swimming pool skimmer assembly as set forth in claim 27 wherein said reversible weight is glued to the bottom of said skimmer basket with marine epoxy.

30. A swimming pool skimmer assembly comprising:
a skimmer basket; and
a handle attached to a reversible weight wherein said reversible weight has a plurality of fasteners capable of locking a flange base of said handle to the top of said reversible weight when said flange base is pressed down on top of said reversible weight, and wherein the bottom of said reversible weight is attached to the bottom of said skimmer basket,
said handle having a column that positions a grip of said handle above the top of said skimmer basket when said handle is attached to said reversible weight and said reversible weight is attached to said skimmer basket.

31. A handle capable of being attached to a skimmer basket, said handle having a column that positions a grip of said handle above the top of said skimmer basket when said handle is attached to said skimmer basket, wherein said handle has portions that form a plurality of lateral extensions on a side of said column of said handle, said plurality of lateral extensions capable of interlocking with a second plurality of lateral extensions on a side of a column of a second similar handle.

32. A base handle comprising a handle as set forth in claim 31 wherein a grip portion of said handle has been removed from said handle.

33. An extension handle comprising a handle as set forth in claim 31 wherein a flange portion of said handle has been removed from said handle.

34. A combination handle capable of being attached to a skimmer basket, said combination handle having a column that positions a grip of said handle above the top of said skimmer basket when said combination handle is attached to said skimmer basket, wherein said combination handle comprises:
a base handle comprising a first handle having portions that form a first plurality of lateral extensions on a side of a column of said first handle, and wherein a grip portion of said first handle has been removed from said first handle, and
an extension handle comprising a second handle having portions that form a second plurality of lateral extensions on a side of a column of said second handle, and wherein a flange portion of said second handle has been removed from said second handle,
wherein said first plurality of lateral extensions interlock with said second plurality of lateral extensions when the side of said base handle having a first plurality of lateral extensions is positioned next to the side of said extension handle having a second plurality of lateral extensions, and
a connector capable of attaching said base handle to said extension handle.

35. A combination handle as claimed in claim 34 where said connector is selected from the group consisting of plastic ties, locking clips and hollow couplings.

36. A combination handle capable of being attached to a skimmer basket, said combination handle having a column that positions a grip of said handle above the top of said skimmer basket when said combination handle is attached to said skimmer basket, wherein said combination handle comprises:
a base handle comprising a first handle wherein a grip portion of said first handle has been removed from said first handle, and
an extension handle comprising a second handle wherein a flange portion of said second handle has been removed from said second handle, and
a hollow coupling capable of attaching the upper end of said base handle to the lower end of said extension handle.

37. A non-rigid handle that is capable of being folded, said handle capable of being attached to a skimmer basket, said handle having at least one leg that positions at least one grip of said handle above the top of said skimmer basket when said handle is attached to said skimmer basket.

38. A handle as set forth in claim 37 wherein said at least one leg positions said at least one grip of said handle above the top of the water level in a skimmer well when said skimmer basket is in said skimmer well.

39. A swimming pool skimmer assembly comprising:
a skimmer basket; and
a non-rigid handle that is capable of being folded, said handle attached to said skimmer basket wherein said handle comprises at least one leg that positions at least one grip of said flexible handle above the top of said skimmer basket when said flexible handle is attached to said skimmer basket.

40. A swimming pool skimmer assembly as set forth in claim 39 wherein said at least one leg positions said at least one grip of said handle above the top of the water level in a skimmer well when said skimmer basket is in said skimmer well.

41. A handle capable of being attached to a skimmer basket, said handle having a column that positions a grip of said handle above the top of said skimmer basket when said handle is attached to said skimmer basket, wherein said handle has an end portion capable of being attached to a bottom of said skimmer basket, said end portion having portions forming at least one fastener aperture within said end portion of said handle to receive at least one fastener to attach said end portion of said handle to said bottom of said skimmer basket.

42. A handle as set forth in claim 41 wherein said handle is attached to said skimmer basket by passing at least one fastener through an aperture in the bottom of said skimmer basket and by securing said at least one fastener within said at least one fastener aperture of said end portion of said handle.

43. A swimming pool skimmer assembly as set forth in claim 41 wherein said handle is attached to said skimmer basket by passing at least one fastener through an aperture in the bottom of said skimmer basket and by securing said at least one fastener within said at least one fastener aperture of said end portion of said handle.

44. A swimming pool skimmer assembly comprising:

a skimmer basket: and a handle attached to said skimmer basket, said handle having a column that positions a grip of said handle above the top of said skimmer basket when said handle is attached to said skimmer basket, wherein said handle has an end portion attached to a bottom of said skimmer basket, said end portion having portions forming at least one fastener aperture within said end portion of said handle to receive at least one fastener to attach said end portion of said handle to said bottom of said skimmer basket.

\* \* \* \* \*